United States Patent [19]

Tanaka et al.

[11] Patent Number: 5,499,379
[45] Date of Patent: Mar. 12, 1996

[54] INPUT/OUTPUT EXECUTION APPARATUS FOR A PLURAL-OS RUN SYSTEM

[75] Inventors: Shunji Tanaka, Machida; Toru Ohtsuki, Hadano; Hiroaki Sato, Hadano; Hideo Sawamoto, Hadano; Ryo Yamagata, Hadano; Masaya Watanabe, Hadano; Hidenori Umeno, Kanagawa; Masatoshi Haraguchi, Fujisawa, all of Japan

[73] Assignee: Hitachi, Ltd., Tokyo, Japan

[21] Appl. No.: 8,842

[22] Filed: Jan. 25, 1993

Related U.S. Application Data

[63] Continuation of Ser. No. 373,216, Jun. 28, 1989, abandoned.

[30] Foreign Application Priority Data

Jun. 30, 1988 [JP] Japan ................................ 63-164758

[51] Int. Cl.$^6$ ........................................................ G06F 9/00
[52] U.S. Cl. ........................... 395/700; 395/821; 364/941; 364/976.3; 364/DIG. 2
[58] Field of Search ..................................... 395/700, 275; 364/941, 976.3, DIG. 2

[56] References Cited

U.S. PATENT DOCUMENTS

| | | | |
|---|---|---|---|
| 4,128,880 | 12/1978 | Cray | 364/200 |
| 4,400,769 | 8/1983 | Kaneda et al. | 395/650 |
| 4,636,942 | 1/1987 | Chen et al. | 364/200 |
| 4,812,967 | 3/1989 | Hirosawa et al. | 364/DIG. 1 |
| 4,814,975 | 3/1989 | Hirosawa et al. | 364/DIG. 1 |
| 4,837,674 | 6/1989 | Takane | 395/275 |
| 4,843,541 | 6/1989 | Bean et al. | 395/275 |
| 4,885,681 | 12/1989 | Umeno et al. | 364/200 |
| 4,887,202 | 12/1989 | Tanaka et al. | 364/200 |
| 5,027,271 | 6/1991 | Curley et al. | 364/200 |
| 5,088,031 | 2/1992 | Takasaki et al. | 395/400 |
| 5,109,489 | 4/1992 | Umeno et al. | 395/275 |

FOREIGN PATENT DOCUMENTS

| | | |
|---|---|---|
| 191046 | 11/1983 | Japan . |
| 57438 | 4/1985 | Japan . |
| 83168 | 5/1985 | Japan . |
| 122445 | 6/1985 | Japan . |
| 150140 | 8/1985 | Japan . |
| 108335 | 5/1987 | Japan . |
| 3342 | 1/1988 | Japan . |
| 159572 | 6/1988 | Japan . |

OTHER PUBLICATIONS

IBM VM/Extended Architecture Migration Aid Program Summary, Program Number 5664–169, Oct. 1981.

Primary Examiner—Alyssa H. Bowler
Assistant Examiner—John Harrity
Attorney, Agent, or Firm—Antonelli, Terry, Stout & Kraus

[57] ABSTRACT

A plural-OS run system in which a plurality of operating systems (OSs) capable of operating on machines of different architectures, respectively, are allowed to run on one bare machine under the control of one control program (CP) or one control means. The input/output instruction and input/output interrupt of the operating system capable of running on a machine of the same architecture as that of the bare machine are directly executed on the bare machine without need for translation of the format. The input/output instruction and the input/output interrupt of the operating system adapted to run on a machine of the architecture differing from that of the bare machine are allowed to be directly executed while translating the format.

3 Claims, 27 Drawing Sheets

FIG. 5
SRID INSTRUCTION
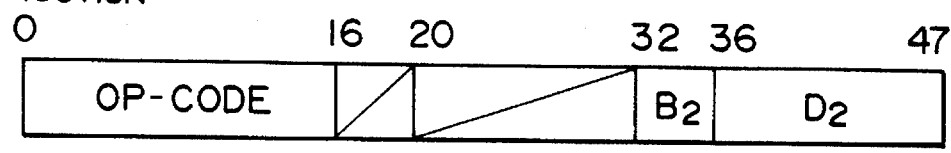
GR 1
2ND OPERAND ADDRESS
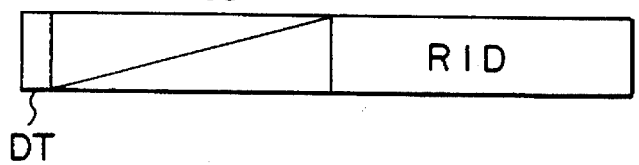

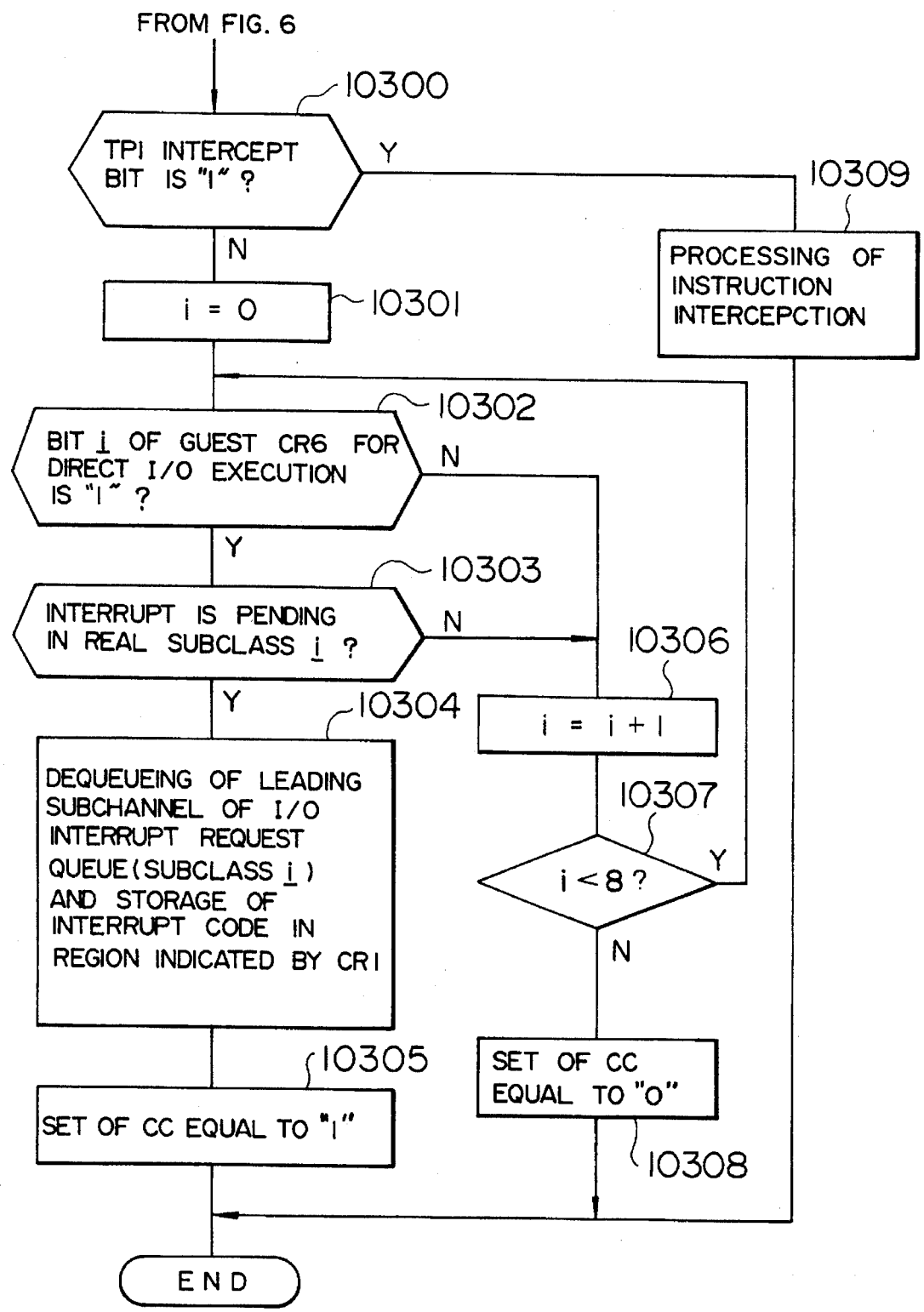

FIG. 12B
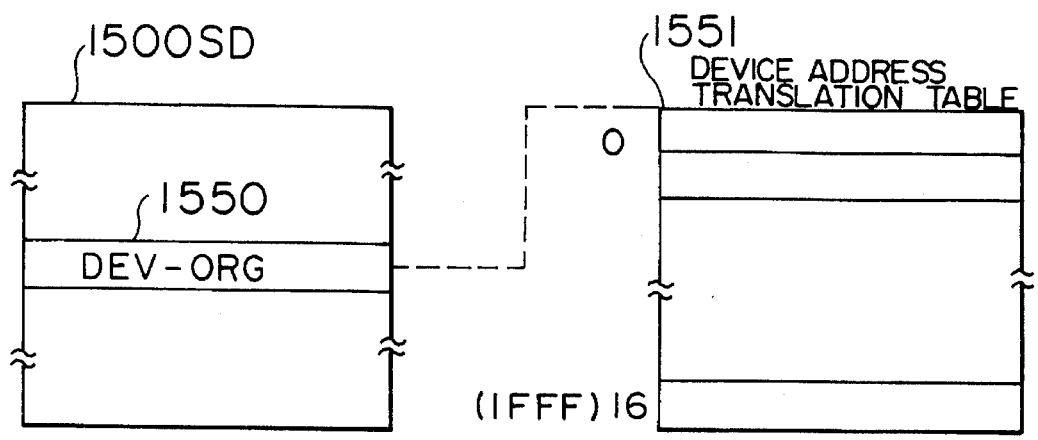
ENTRY OF DEVICE ADDRESS TRANSLATION TABLE (DEVTBL)
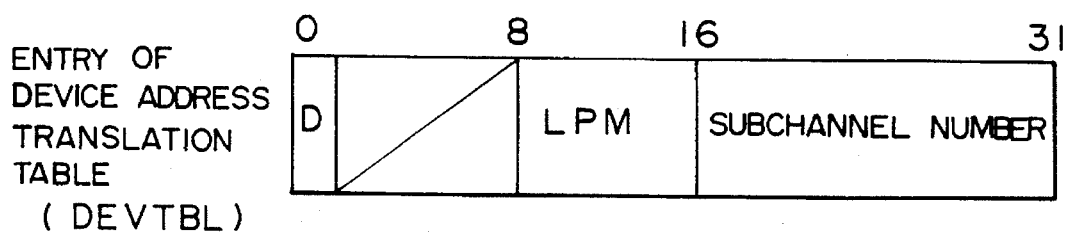
FIG. 12C
SCL-CNTL
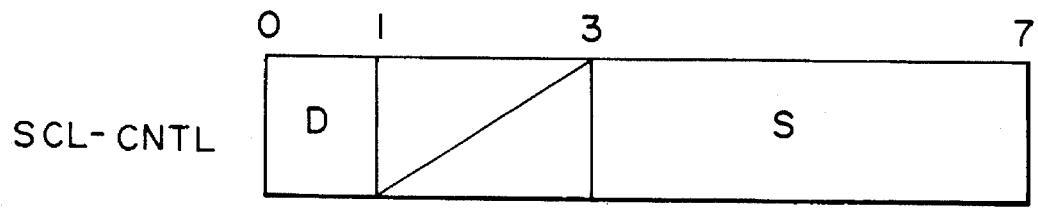

FIG. 13

| # | SUBCHANNEL INFORMATION | SET VALUE | BIT LENGTH |
|---|---|---|---|
| 1 | INTERRUPT PARAMETER | BIT 0-15 ARE (0000)16 WITH BITS 16-31 BEING I/O ADDRESS | 32 |
| 2 | SUBCHANNEL KEY | KEY OF CAW | 4 |
| 3 | SUSPEND FLAG (S) | 0 | 1 |
| 4 | FORMAT FLAG (F) | 0 | 1 |
| 5 | PREFETCH CONTROL (P) | 0 | 1 |
| 6 | INITIAL STATE (I) | 0 | 1 |
| 7 | ADDRESS CHECK (A) | 0 | 1 |
| 8 | INHIBIT OF SUSPENDED INTERRUPT (U) | 0 | 1 |
| 9 | LPM | LPM IN DEVICE ADDRESS TRANSLATION TABLE | 8 |
| 10 | CHANNEL PROGRAM ADDRESS | BIT 0-7 ARE (00)16 WITH BITS 8-31 BEING BITS 8-31 OF GUEST CAW | 32 |

FIG. 17

| # | M-MODE INTERRUPT INFORMATION | SUBCHANNEL INTERRUPT INFORMATION | BIT LENGTH |
|---|---|---|---|
| 1 | PROTECTION KEY OF CSW | PROTECTION KEY | 4 |
| 2 | BIT 4 OF CSW | 0 | 1 |
| 3 | LOGOUT SUSPENDING BIT OF CSW | 0 | 1 |
| 4 | DEFERRED CC OF CSW | DEFERRED CC | 2 |
| 5 | CCW ADDRESS OF CSW | CCW ADDRESS BITS 8-31 | 24 |
| 6 | DSB OF CSW | DSB | 8 |
| 7 | CSB OF CSW | SSB | 8 |
| 8 | COUNT OF CSW | COUNT | 16 |
| 9 | I/O ADDRESS (2 BYTES FROM ADDRESS 186) | INTERRUPT PARAMETER BITS 16-31 | 16 |

FIG. 23
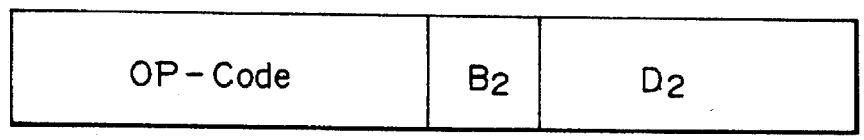
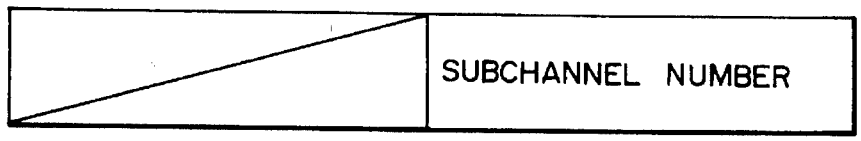
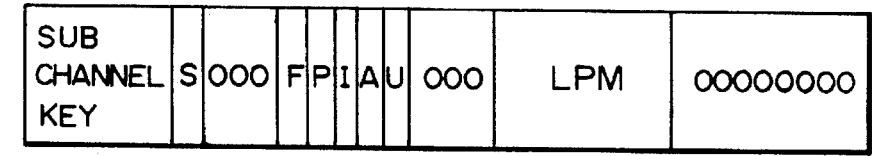

FIG. 24
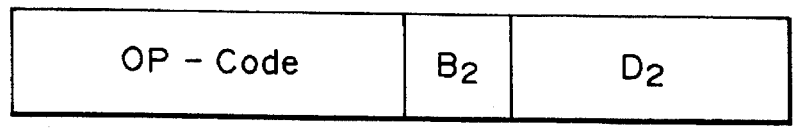
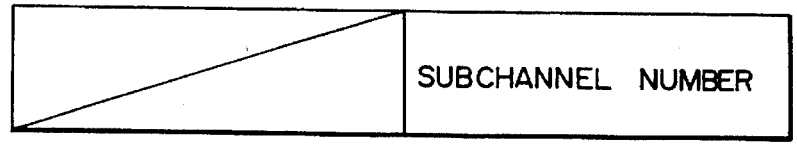
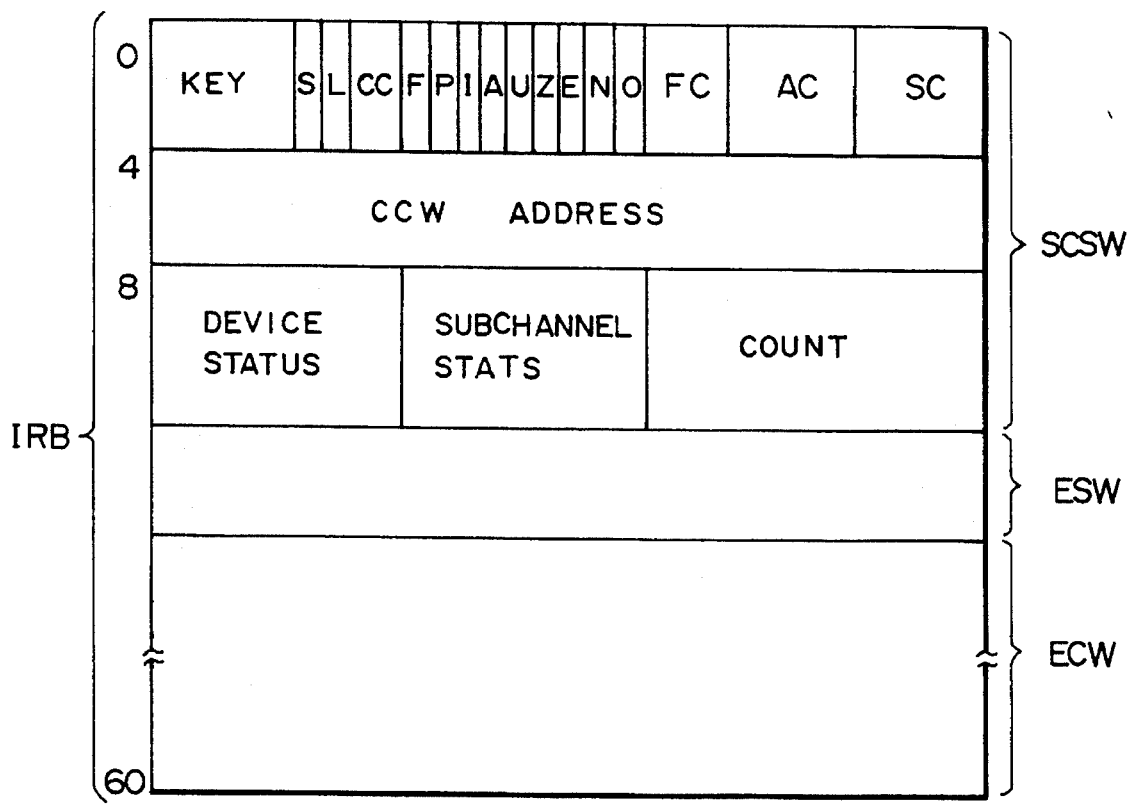

FIG. 25
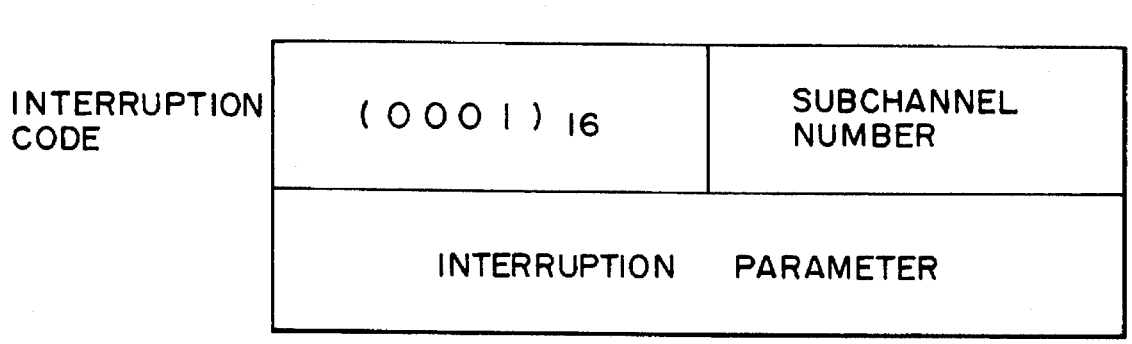
FIG. 26
FIG. 27
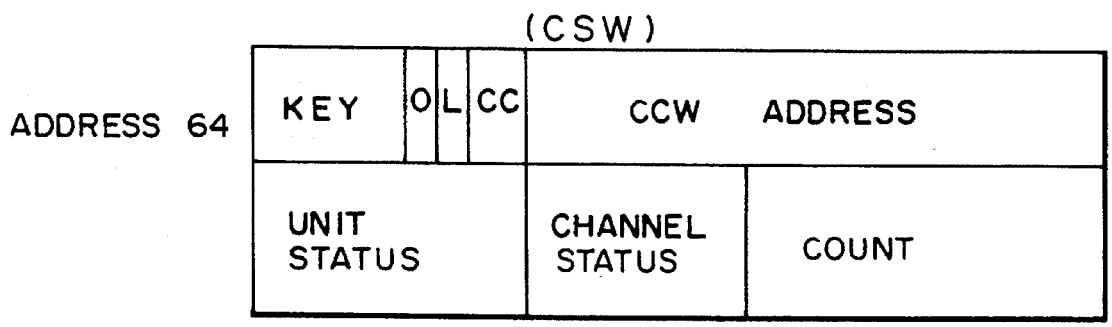

INPUT/OUTPUT EXECUTION APPARATUS FOR A PLURAL-OS RUN SYSTEM

This application is a continuation of application Ser. No. 373,216, filed on Jun. 28, 1989, now abandoned.

BACKGROUND OF THE INVENTION

The present invention relates generally to an input/output execution apparatus for a plural-OS run system in which a plurality of operating systems or OSs are allowed to run on a bare machine. More particularly, the invention is concerned with an input/output execution apparatus which is capable of executing a plurality of input/output (I/O) instructions and input/output (I/O) interrupts having an achitecture of the bare machine and/or other architectures differing from that of the bare machine.

As a typical example of a system which is designed to allow a plurality of operating systems (OSs) to run on a single computer, there is mentioned a logical partitioned system disclosed in JP-A-64-37636 and a virtual machine system. In the data processing system disclosed in the publication mentioned above, a single computer resource is logically partitioned so as to be made available by each of the plurality of OSs with a view to allowing the OS to execute the input/output interrupt processing at a high speed. This known logical partitioned system is characterized in that hardware including microcodes controls the runs of the plural OSs. Thus, such a control program as required by a virtual machine system is rendered unnecessary in the case of the logical partitioned system.

In JP-A-62-31437 corresponding to U.S. patent application Ser. No. 890,524 filed on Jul. 13, 1986 in the name of S. Tanaka et al. now U.S. Pat. No. 4,887,202, there is disclosed a virtual machine system in which input/output instructions issued by an OS on a virtual machine and input/output interrupts to an OS on a virtual machine are directly or straightforwardly executed by the hardware.

With the virtual machine system (hereinafter referred to simply as "VMS"), it is intended to mean a system which makes it possible for a plurality of logical machines, i.e. virtual machines (hereinafter referred to as 'VM') to simultaneously run on a single real computer. Recently, such a system has been developed and reported in which both a VM of a 370-XA architecture having an addressing mechanism of 31 bits and a VM of a S/370 architecture having an addressing mechanism of 24 bits can simultaneously run on a real computer of the 370-XA architecture, as is described, for example, in "IBM System/370 Extended Architecture Interpretive Execution SA-22-7095". For more particulars of the architectures 370-XA and S/370, reference may be made to "370-XA Principles Of Operation SA-22-7085" and "S/370 Principles Of Operation GA-22-7000", respectively. Parenthetically, these architectures 370-XA and S/370 correspond, respectively, to the M/EX and M architectures in the M-series general purpose computers commercially available from Hitachi Ltd. of Japan.

The architectures S/370 and 370-XA of the machines described in the literatures cited above or the architectures M/EX and M of the M-series general purpose computers differ from each other in respect to the format for the input/output instruction and the input/output interrupt in addition to the addressing mechanisms. Under these circumstances, the input/output instruction and the input/output interrupt of the VM are simulated with the aid of a virtual machine control program (hereinafter referred to as 'VMCP'). However, the simulation of the input/output instruction and the input/output interrupt by the VMCP takes a lot of time, lowering the processing speed, because the simulation is performed by employing a program to this end.

In view of the situation mentioned above, and for the purpose of reducing the overhead involved in the input/output simulation, there has been proposed a method of directly executing the input/output processings of the VM all by hardware as disclosed in, for example, JP-A-60-150140 corresponding to U.S. patent application Ser. No. 691,909 filed Jan. 16, 1985 in the name of H. Umeno et al. now U.S. Pat. No. 4,885,681 which is incorporated herein by reference. In this publication, a method is disclosed for executing directly the input/output instruction and the input/output interrupt of a VM of the M/EX-mode on a hardware basis in a real computer of M/EX architecture, which will be described below in detail by reference to several figures of the accompanying drawings.

FIGS. 18 to 22 of the accompanying drawings are views for elucidating operation of a direct input/output (I/O) execution system, wherein FIG. 18 is a block diagram showing generally a functional structure of a computer of the M/EX architecture.

The computer is composed of a main storage 1000, a central processing unit (CPU) 2000, an input/output processor (IOP) 3000, an input/output controller (IOC) 4000 and an input/outout (I/O) device 5000. The IOC and the I/O device are shown as single devices for the convenience of description, although each of these devices is provided in multiplicity in practical applications. The main storage 1000 stores therein an I/O execution request queue 1100, an I/O interrupt request queue 1200, an address translation table 1300 for the IOP, an area for a number of subchannels 1400 corresponding to the number of the I/O devices and a SD region 1500 for a number of state descriptions (SD) corresponding to that of the VMs. The state description or SD holds a register value of VM and assumes the initial value thereof upon activation of the VM, as is described in the literature entitled "IBM System 370 Extended Architecture Interpretive Execution" mentioned hereinbefore. The CPU 2000 includes an instruction register 2100 for storing the instruction read out from the main storage 1000, an instruction decoder 2110 for decoding the instruction, an instruction executing circuit 2120 for executing the instruction, a host interrupt activating circuit 2210 for deciding whether or not the VMCP is capable of interruption, an interrupt processing circuit 2300 for performing the interrupt processing and a variety of control registers such as an IE-mode bit register 2400, a host PSW register 2410 and a host CR6 register 2420 provided in association with the VMCP, and a guest PSW register 2430 and a guest CR6 register 2440 provided in association with the VM.

In the following, operation of the computer system having the structure outlined above will be described with regard to (i) environment setting or establishing processing, (ii) VM activation processing, (iii) execution of I/O instruction of VM and (iv) execution of I/O interrupt to VM in this order.

(i) Environment setting processing for direct I/O execution

FIG. 19 of the accompanying drawings is a view for illustrating the relation existing between a real main storage of a real computer and the main storages of the VMs together with the contents of the address translation table for the IOP.

In the exemplary case shown in FIG. 19, the objective (object) for the direct I/O execution is a VM of a resident storage mode (also represented by V=Resident VM) in which the main storage (level-2 memory) 1000-1 of the VM exists on the real main storage (level-1 memory) with displacement of $\alpha_i$ (i=1, 2, ...). Accordingly, the address translation table 1300 for translating the address of level 2 to that of level 1 is first prepared. The address translation table 1300 for the IOP is of such a structure that a set of an origin address $\alpha_i$ and an end address $\alpha_{i+1}$ of the main storage of VM on the real storage 1000 can be determined from a region identifier (RID) identifying the VM. In the case of the system disclosed in JP-A-60-150140 mentioned hereinbefore, the objective for the direct input/output (I/O) execution is the I/O device dedicated only to a VM of concern. Accordingly, in the processing for the dedication of the I/O device to the VM, the VMCP sets to "1" a subchannel direct I/O flag (SCH-DIO) 1410 of the subchannel 1400 corresponding to the I/O device of concern while setting a region identifier RID of the dedicatee VM at a subchannel region identifier (SCH-RID) so that the CPU 2000 can discriminatively identify the dedicated state of the I/O device. The region identifier RID is identical with the corresponding RID of the address translation table 1300 for the IOP which is affixed to the main storage of the dedicatee VM to which the I/O device is dedicated (refer to FIG. 19).

(ii) VM activation processing

A SIE (Start Interpretive Execution) instruction which is the instruction for activating a VM has as an operand the address of the SD (state description) 1500 of the main storage 1000 shown in FIG. 18. The SD 1500 includes a SD-DIO 1510 for indicating the direct input/output execution when the content thereof is "1", an RID set at the region identifier in state description (SD-RID) 1520 for allowing the CPU to identify the running VM, and a state description architecture identifier (SD-ARCH) 1530 for allowing the CPU to identify the architecture (i.e. M/EX or M) of the running VM. More specifically, when the SD-ARCH identifier 1530 is "0", this means that the running VM is in the M mode while identifier 1530 of "1" indicates that the VM is in the M/EX mode. It should be mentioned that the SD-DIO (direct I/O execution flag in state description) 1510, the SD-RID 1250 and the SD-ARCH 1530 are set by the VMCP and cannot be modified by hardware.

Upon the issuance of the SIE instruction, the instruction execution circuit 2120 sets "1" at the interpretive execution (IE) mode bit 2400, indicating that the VM is running, while the values of the host PSW and CR6 of the VMCP are set at the host PSW 2410 and the host control register CR6 2420, respectively, with the values of the guest resister stored in the SD 1500 corresponding to the VM being set at the guest PSW 2430 and the guest CR6 2440, respectively. However, an I/O mask realized by the bit 6 of the host PSW 2410 is placed with bit 6 of the guest PSW 2430. Further, dedication of interrupt subclass (also referred to simply as subclass) is a prerequisite for the direct execution of the input/output interrupt. To this end, when the VMCP allows a real subclass 1 to be dedicated to a VM1 and when the real subclass 1 corresponds to a virtual subclass 0, (a) the bit 1 of the host CR6 2420 (i.e. the mask of the real subclass 1) is placed with "0", if the mask value of the virtual subclass is "0", i.e. if the bit 0 of the guest CR6 2440 is "0", and (b) the bit 1 of the host CR6 2420 is placed with "1", if the mask value of the virtual subclass 0 is "1".

Through the processing described above, it is possible to make a decision for the subclass dedicated to a running VM as to the allowableness of an interrupt to a VM with the aid of the I/O mask of the host PSW 2410 and the mask of the host CR6 2420.

(iii) Execution of I/O instruction of VM

The input/output activation instruction issued by the running VM of the M/EX-mode is executed by the instruction execution circuit 2120 in the manner described below.

(a) The instruction execution circuit 2120 makes access to the SD-DIO 1510 of the SD 1500, wherein when the SD-DIO 1510 is "1", a next step (b) is executed. Otherwise, execution of the instruction is prohibited or suppressed, whereon the instruction execution circuit 2120 intercepts the instruction and transfers it to the VMCP.

(b) The instruction execution circuit 2120 makes access to the subchannel designated by the instruction. When the SCH-DIO 1410 is "1" and when the SCH-RID 1420 is in coincidence with the SD-RID 1520, execution proceeds to the next step (c). Otherwise, execution of the instruction is suppressed, and the circuit 2120 intercepts the instruction and transfers it to the VMCP.

(c) Subsequently, the instruction execution circuit 2120 calculates the address of a second operand ($B_2/D_2$) and locates the input/output information stored at the calculated address in a predetermined region in the corresponding subchannel 1400.

(d) In case the subchannel is in the state ready for executing the input/output operation (i.e. when the channel and the IOC 4000 leading to the corresponding input/output device 5000 are free or vacant), the input/output execution is performed while adding the origin address $\alpha_i$ of the relevant VM stored in the IOP address translation table 1300 corresponding to the SCH-RID 1420 to the data address and CCWs address of a group of virtual channel command words (CCW) (see FIG. 19) on the level-2 memory prepared by the OS by the address translation circuit 3100 incorporated in the IOP 3000. On the other hand, unless the subchannel 1400 is in the state ready for the input/output execution (i.e. when the channel or IOC is busy), the subchannel 1400 is queued in an I/O execution request queue 1100 shown in FIG. 20. When the subchannel and the IOC become vacant or free, the IOP 3000 performs a reactivation processing for the input/output execution request queued in the I/O execution queue 1100.

In this way, the input/output instruction to the device dedicated to the running VM is directly or straightforwardly executed by hardware without intervention of the VMCP.

(iv) Execution of I/O interrupt to VM

It is assumed that the subchannel 1400 is placed in correspondence relation with the virtual subclass 0, i.e. the real subclass 1 which is an interrupt subclass for the direct input/output execution. In that case, the value of the I/O mask of the guest PSW 2430 coincides with that of the I/O mask of the host PSW 2410 and additionally the value of the bit 0 corresponding to the virtual subclass 0 of the guest CR6 2420 is in coincidence with that of the bit 1 which corresponds to the real subclass 1 of the host CR6. Thus, for the subchannel 1400 to which the virtual subclass 0 is allocated, the interrupt enabling condition in the host coincides with the interrupt enabling condition in the guest. The interrupt of the subchannel 1400 is executed in a manner described below.

(a) When an interrupt request takes place in the subchannel 1400, the IOP 3000 places the subchannel 1400 in an I/O interrupt request queue 1200 (see FIG. 21) for the subclass 1 represented by the real subclass number which is set in the subchannel 1400.

(b) Subsequently, the IOP 3000 sets to "1" the bit 1 (corresponding to the real subclass 1) of a real interrupt suspending or reserving register 2214 incorporated in the host interrupt activation circuit 2210 shown in FIG. 22.

(c) Assuming that the bit 1 of the host CR6 2420 is "1", then the output of the AND circuits 2211 corresponds to the subclass 1 assumes "1" with the output of an OR circuit 2212 also being "1". Further, when the value of the I/O mask of the host PSW 2410 is "1", the output of an AND circuit 2213 is "1", whereby an activation signal is sent to the interrupt processing circuit 2300.

(d) In the interrupt processing circuit 2300, the leading subchannel 1400 of the I/O interrupt request queue 1200 for the relevant subclass is dequeued, whereon the interrupt code stored in the subchannel 1400 is placed in a predetermined region of a prefix save area (PSA) of the VM. The PSA is an area for storing interface information between the software and hardware, wherein the start address for the interrupt processing routine or the like information is stored at the predetermined address. Further, the guest PSW 2430 at the time of interruption is saved in an I/O OLD PSW field in the PSA of the VM, while a new PSW for the I/O interrupt in the PSA of VM is loaded in the guest PSW 2430, being followed by execution of the instruction, whereupon the interrupt processing comes to an end.

As will be appreciated from the foregoing description, for the subclass for direct input/output execution which is dedicated to a running VM, interruption to the VM is executed only when it is possible. On the other hand, in case the VM is in the state not ready for interrupting on the subclass for the direct input/output execution upon occurrence of an interrupt request, the subchannel 1400 is queued in the relevant one of the I/O interrupt request queues 1200.

The system described in JP-A-60-150140 is certainly effective for reducing significantly overhead involved in the input/output processing of the VM of the resident storage mode. However, this conventional technology system suffers from the four problems, as described be low.

(a) The first problem relates to the input/output interrupt. More specifically, because the I/O mask of the guest PSW 2430 is set by the I/O mask of the host PSW 2410 during the running of the OS, there arises such a situation arises in which the I/O interrupt to the other OS or host is undesirably prohibited when the I/O mask of the guest PSW 2430 is "0". With the term "host", it is intended to indicate a plural-OS control hardware means in the case of a system as in the logical partition system in which a plurality of OSs can run on a single computer under the control of the plural-OS control hardware means. In a virtual machine system, the "host" means a VMCP.

(b) The second problem relates to the machine architecture. More specifically, in the case of the system described in JP-A-60-150140, the direct input/output execution of the OS of M/EX architecture is performed under the control of the real computer of a M/EX mode. However, the situation arises in which the direct I/O execution of the OS the of M mode should desirably be performed efficiently under the control of the real computer of the M/EX architecture. For coping with this problem, there is disclosed in JP-A-62-108335 corresponding to a U.S. Pat. No. 4,814,975 a system in which the input/output instruction issued by an OS on a VM is once intercepted and transferred to the VMCP, whereon the VMCP reissues the instruction by designating the architecture of the above-mentioned VM. Thus, the intercept and transfer of the instruction issued by the OS on the VM to the VMCP and simulation by the VMCP lead to overhead.

In JP-A-63-3342, there is disclosed a system in which upon issuance of the input/output execution request of a VM or occurrence of the input/output interrupt request to a VM, the architecture of the VM is determined based on the VM identifier to thereby perform the input/output processing which conforms to the architecture of the VM. However, also in this system, the processing for determining the architecture of the VM presents overhead. It should further be pointed out that the publication mentioned above discloses no teaching concerning how to decide whether the VM is capable of input/output interrupt.

In JP-A-58-191046, there is disclosed a system in which a real computer of S/370-mode executes directly the input/output instruction of a VM of the same architecture S/370 and the input/output interrupt to a VM of the same architecture S/370.

Further, disclosed in JP-A-60-83168 is a real computer of the 370/XA-mode in which the input/output instruction of a VM of the S/370-mode and the input/output interrupt to a VM of the S/370-mode are simulated by a VMCP (referred to as partitioned multiple processing program PMP in this publication).

Additionally, JP-A-60-57438 discloses a virtual machine system controller in which a plurality of different microprograms are prepared for one computer, wherein a corresponding microprogram is selected for each of the VMs for executing an instruction, to thereby allow an OS having an architecture different from that of the bare machine to run. However, the teaching of this publication is concerned only with the microprograms in an instruction processing unit and thus can not be applied to the OS input/output instruction and the input/output interrupt which relate to the input/output processing operation and the input/output interrupt operation, respectively.

In JP-A-58-20066, there is disclosed a method and a virtualizer system in which a plurality of virtual machines each equivalent to a bare machine are generated, wherein correspondence is established between a virtual resource simulated on a general purpose host computer and a real process executed by the host computer. However, this hardware virtualizer is not inputted with the architectures of the virtual machines. Consequently, it is impossible to process the input/output instruction of the OS and the input/output interrupt to the OS on the virtual machine in accordance with the architecture thereof.

(c) The third problem is seen in conjunction with the I/O interrupt processing which ends abnormally. More specifically, when the input/output operation to a device dedicated to a given OS has ended abnormally due to channel error, it is desirable to inform a host of this interrupt to thereby make the host perform the recovery processing for removing the channel error. In other words, in case the input/output operation has ended in a particular state, it is desirable not to interrupt directly the OS but to inform the host of this fact, because then the reliability of the input/output operation of other OS executed by other input/output device under the same channel can be enhanced by the recovery processing performed by the host. However, in the system disclosed in the publication mentioned just above, it is impossible to inform the host of the input/output interrupt ended in the particular state.

(d) The fourth problem relates to the execution of load control instruction of the guest CR6. More specifically, in order to execute directly the input/output interrupt to an OS, it is necessary that hardware can determine the condition for enabling the input/output interrupt to the OS. Accordingly, when the OS has altered or modified the guest CR6, the hardware has to process the interrupt in accordance with the interrupt enabling condition indicated by the altered guest CR6. However, due to the absence of the translating means for translating the virtual subclass number to the real subclass number in the conventional systems mentioned above, it is impossible to execute efficiently the load control instruction of the guest CR6 without intercepting the host.

SUMMARY OF THE INVENTION

An object of the present invention is to solve the problems of the conventional systems described above and provide an input/output execution apparatus for a plural-OS run system in which a plurality of OSs run on a single real computer of M/EX architecture under the control of a host (control program or control means), which apparatus is capable of executing efficiently the input/output instructions and input/output interrupts for OSs of M and M/EX-modes having different architectures.

Another object of the present invention is to provide a plural-OS run system in which when the OSs of the M-mode and the M/EX-mode are to run simultaneously, the input/output instruction and the input/output interrupt for both the OSs can be executed with a high efficiency.

It is still another object of the present invention to provide a plural-OS run system in which even when an OS is running, the input/output interrupt to another OS or the host is not prohibited regardless of the set state of the input/output mask of the running OS.

A further object of the present invention is to provide a plural-OS run system in which the interrupt ended abnormally can be messaged to the host.

It is a still a further object of the present invention to provide a plural-OS run system which is capable of translating the subclass number for suppressing interception of the host upon alteration of a guest control register by an OS.

For achieving the above objects, there is provided according to an aspect of the invention an input/output execution apparatus for a plural-OS run system in which a plurality of OSs capable of running on a computer having a first architecture (M/EX) and a computer having a second architecture (M) are allowed to run simultaneously under the control of a real computer of the first architecture and a host.

(i) The input/output execution apparatus comprises in correspondence with each of the input/output devices of the real computer, respectively a means (1410) for making decision for each of the input/output devices of the real computer as to whether the input/output device is dedicated to a particular one of the OSs, means (1510) for determining the architecture of the OS running on the real computer, and a means (6) for responding to an input/output instruction of the first architecture issued by the running OS to thereby issue an input/output instruction to the input/output device designated by the input/output instruction when the running OS has the first architecture and when the input/output device designated by the input/output instruction is dedicated to the currently running OS, while intercepting the host when the above-mentioned input/output device is not dedicated to the currently running OS.

(ii) Further, the input/output execution apparatus may include a means (FIG. 8A) for responding to an issuance of an input/output instruction of the second architecture by an OS having the first architecture for thereby interrupting the OS or the host.

(iii) The real computer may include means for translating an input/output instruction of the second architecture into an input/output instruction of the first architecture, and means for responding to the issuance of an input/output instruction of the second architecture by a running OS to thereby translate the input/output instruction of the second architecture into a corresponding input/output instruction of the first architecture for execution thereof, when the OS has the second architecture and when the input/output device designated by the input/output instruction of the second architecture is dedicated to the currently running OS, while intercepting the host unless the above-mentioned input/output device is dedicated to the currently running OS (FIGS. 8A, 8B; FIG. 12B and FIG. 13).

(iv) Further, the real computer may include means for responding to the issuance of an input/output instruction of the first architecture by an OS having the second architecture to thereby intercept and transfer the input/output instruction to the host or the OS (refer to FIG. 6).

(v) In the real computer, there may be prepared a direct input/output execution bits (1410) in correspondence with the input/output device for indiating the dedicated state thereof and a dedicatee OS region identifier (ID) field (1420) for identifying the OS to which the input/output device is dedicated. The real computer may include means for indicating a running OS region ID (1520) to identify a running OS in response to an OS run start instruction and for responding to the issuance of an input/output instruction by the running OS for intercepting the host when the value of the dedicatee OS region ID field for the relevant input/output device differs from the value of the running OS region ID and when the direct input/output execution bit of the above-mentioned input/output device indicates the non-dedicated state (FIGS. 6 and 8).

(vi) The real computer may include means for updating the direct input/output execution bit and the dedicatee OS region ID field (FIG. 5).

(vii) The real computer may include a real main storage on which a main storage of OS is resident, address translation means (1300) for furnishing address correspondence relations between the main storage of the OS and the real main storage, and means for responding to preparation of a channel command word (CCW) by an OS for commanding an input/output operation to an input/output device and subsequent issuance of an input/output instruction for activating the input/output operation to the above-mentioned input/output device by translating the address of the CCW prepared by the OS to the address of the real main storage by the address translating means, when the input/output device of concern is dedicated to a currently running OS, wherein the address value of the real main storage resulting from the address translation is fetched for executing the above-mentioned input/output instruction while translating data address of the CCW to the address of the real main storage (FIG. 11).

(viii) In the real computer, a flag (1530) for designating the input/output processing mode of the running OS may be provided, wherein when the flag indicates the direct input/output execution, the input/output execution processing described in the paragraph (vii) can be validated. On the other hand, unless the flag indicates the direct input/output execution, all the input/output instructions of the OS are intercepted and transferred to the host regardless of whether the input/output device is in the dedicated state or in the non-dedicated state.

(ix) In the real computer, an instruction (FIG. 3) for updating the contents of the address translation means may be employed, operands of which instruction include a start address identifier for the main storage of OS in the real main storage, a region length identifier and a region identifier for the purpose of identification of OS.

(x) In the real computer, an input/output instruction (FIG. 4) may be employed for designating as the operand the region identifier to an operand of the input/output instruction of the first architecture. The instruction serves to translate the address of the CCW in the OS region designated by the region identifier to the address of the real main storage with the aid of the address translation means corresponding to the region identifier designated by the instruction, wherein the value resulting from the address translation is fetched to thereby execute the input/output instruction while translating the data addresses of the CCW to the addresses of the real main storage by the address translation means.

(xi) The real computer may include means for storing addresses of areas (prefixes) for storing hardware interrupt information of the currently running OS, wherein in the OS of the first architecture having one or a plurality of interrupt subclasses for the direct input/output execution, when an input/output interrupt request is for the direct input/output execution interrupt subclass of the currently running OS and when allowableness of interrupt is indicated at the interrupt subclass mask and the I/O mask designated by the currently running OS, the prefix of the currently running OS is determined by prefix address storage means of the currently running OS, whereby the input/output interrupt is reflected onto the prefix (FIGS. 14 and 16).

(xii) The real computer may include means for storing the address of the prefix, wherein when the input/output interrupt request issued by the OS of the second architecture having one interrupt subclass for the direct input/output execution is for the direct input/output execution interrupt subclass of the currently running OS of the second architecture and when the interrupt allowableness state is indicated at the direct input/output execution I/O interrupt subclass mask and the I/O mask designated by the above-mentioned OS, the prefix of the currently running OS is determined by the prefix address store means of the currently running OS, whereon the interrupt information of the first architecture in the prefix area is translated to the interrupt information of the second architecture to inform the OS of the input/output interrupt (FIGS. 14 and 16 and 17).

(xiii) The real computer may include means for informing the host of the input/output interrupt, when interrupt allowableness is indicated at the I/O mask designated by the host and the interrupt subclass mask designated by the host for the interrupt subclass to which the input/output interrupt request is issued (host interrupt shown in FIGS. 16 and 22).

(xiv) The real computer may include means for reflecting the input/output interrupt to either one of the currently running OS or the host, when the input/output interrupt request taking place in the course of running of OS is that of the direct input/output execution interrupt subclass of the currently running OS and when the allowableness of interrupt is indicated at the I/O mask of the currently running OS and the direct input/output execution interrupt subclass mask and when the allowableness of the interrupt by the host is indicated at the I/O mask designated by the host and the interrupt subclass for which the input/output interrupt request is issued (FIG. 16).

(xv) The real computer may include means for responding to a dispatch instruction of an OS to thereby indicate an interrupt information mask (1560, 2302), wherein for the interrupt request issued during the running of the OS from the direct input/output execution interrupt subclass of the OS and capable of interrupting the OS, no interruption is performed for the running OS but interception is made to the host, when the information of the interrupt contains the interrupt information designated by the above-mentioned interrupt information mask (abnormality processing, FIG. 16).

(xvi) The real computer may include means for intercepting and transferring the interrupt to the host, when the running OS of the second architecture is in the BC-mode, in case the interrupt request is issued during the running of the OS of the second architecture from the direct input/output execution interrupt subclass of that OS (BC-mode, FIG. 15).

(xvii) The real computer may include an OS interrupt subclass register (2450), means for placing the value of the direct input/output execution interrupt subclass mask of the running OS in the OS interrupt subclass register of the corresponding real subclass number, and means for making decision on the basis of the OS interrupt subclass register and the I/O mask of the OS as to whether the running OS can be interrupted or not.

(xviii) The real computer may include an interrupt subclass number translation table and means for responding to an interrupt subclass mask value change instruction issued during the running of the OS having the first architecture for thereby translating the mask value of the direct input/output execution interrupt subclass of the running OS to the corresponding interrupt subclass number by using the above-mentioned translation table, the interrupt subclass number being then placed in the OS interrupt subclass register (FIG. 10).

(xix) The real computer may include means for responding to an instruction of dispatching an OS having the first architecture to thereby place the mask value of the direct input/output execution interrupt of the OS in a corresponding OS interrupt subclass register (FIG. 9 ).

(xx) The real computer may include means for directly executing an instruction for checking the state of a channel path (STCPS instruction) of the input/output instruction of the first architecture without intercepting the STCPS instruction to the host (FIG. 6).

(xxi) In the real computer, a flag may be employed which is utilized in making decision as to whether or not an instruction (TPI instruction) for releasing one interrupt from those reserved or suspended in the interrupt subclass indicating allowableness of the interrupt and issued by the OS having the first architecture is to be intercepted to the host, wherein when the above-mentioned flag indicates the interception for the TPI instruction issued during the running of the OS of the first architectures, the instruction is intercepted to the host, while the instruction is executed for the direct input/output execution interrupt subclass unless the above-mentioned flag indicates the interception to the host.

(xxii) The real computer may include means for executing an input/output instruction (TSCH instruction) of those of the first architecture which serves to release the input/output device designated by the instruction from the interrupt pending state and store the interrupt information in a region of the main storage designated by the instruction without making interception to the host, when the TSCH instruction is issued by an OS of the first architecture to the device dedicated thereto (FIG. 6).

(xxiii) The real computer may include an identifier translation table (FIG. 12B) for translating an input/output device identifier and an input/output execution path identifier in the input/output instruction having the second architecture to an input/output device identifier and an input/output execution path identifier in the corresponding input/output instruction having the first architecture, wherein the input/output instruction of the second architecture issued by a running OS is translated to the input/output instruction of the first architecture (FIG. 13), and the input/output device identifier and the input/output execution path identifier in the corresponding instruction of the first architecture are determined, to thereby execute the corresponding input/output instruction of the second architecture on the basis of the information obtained.

(xxiv) The real computer may include means for responding to an instruction of dispatching an OS of the second architecture to indicate allowableness of interrupt to the OS interrupt subclass register corresponding to the direct input/output execution interrupt subclass of the above-mentioned OS while otherwise indicating disallowableness (10703 in FIG. 9).

According to a teaching of the invention for solving the first problem mentioned hereinbefore, i.e. the problem that the interrupt to other OS or the host is suppressed or prohibited when the I/O mask of the guest PSW is "0", a guest interrupt activation circuit (2220) is provided independent of a host interrupt activation circuit (2210). The guest interrupt activation circuit (2220) serves to determine the interrupt enabling conditions for a running OS in cooperation with the I/O mask of the guest PSW (2430) and the direct I/O execution guest CR6 (2450) which sets the subclass mask dedicated to the running OS for the direct input/output execution.

Further, for solving the second problem mentioned hereinbefore, i.e. for making it possible to perform efficiently the direct input/output execution of the M-mode OS and the M/EX-mode OS on the real computer of M/EX-mode (architecture), the internal structures of the instruction executing circuit (2120) and the interrupt processing circuit (2300) are extended according to another aspect of the invention. Additionally, a device address translation table (1511 in FIG. 12B) is provided for translating a virtual device address designated by an input/output instruction of M-mode to a corresponding subchannel number. More specifically, the instruction executing circuit (2120) is so extended that it can translate an input/output instruction issued by the M-mode OS to a corresponding input/output instruction of M/EX-mode with the aid of the device address translation table for the execution of the instruction. On the other hand, the interrupt processing circuit (2300) is so extended that the interrupt of the M/EX-format from the subclass dedicated to the running M-mode OS for the direct input/output execution taking place during the running of the OS is translated to the interrupt of the M-format to be reflected to the OS.

For solving the third problem mentioned hereinbefore, i.e. with a view to realizing the recovery processing by informing the host of the I/O interrupt processing ended abnormally, it is proposed according to another aspect of the invention to place an interrupt interception mask (IMSK 1560 in FIG. 12A) in the SD (1500) upon activation of OS, wherein when an input/output interrupt of the dedicated subclass capable of interrupting a running OS includes the interrupt information designated by the above-mentioned interrupt interception masks, the interrupt processing circuit (2300) does not interrupt the OS but interrupts the host.

For solving the fourth problem mentioned hereinbefore, i.e. for executing efficiently the input/output interrupt mask updating instruction, there is incorporated in the SD (1500) a subclass number translation table (1540 in FIG. 12A) showing correspondence between the virtual subclass numbers and the real subclass numbers for the OS of M/EX-mode. When the OS issues an instruction for altering the guest CR6 (2440), the instruction executing circuit (2100) updates not only the guest CR6 (2440) but also the mask of the CR6 (2450) for the direct input/output execution in accordance with the subclass number translation table mentioned above.

Operation in general for the plural-OS run system according to the invention can be outlined as follows. The guest interrupt activation circuit (2220) makes a decision as to the conditions enabling the interrupt of the subclass dedicated to a running OS by referring to the I/O mask of the guest PSW (2430) and the guest CR6 (2450) for the direct input/output execution without relying on the I/O mask of the host PSW (2410) and the host CR6 (2420). Thus, different values can be placed in the I/O mask of the host PSW (2410) and the I/O mask of the guest PSW (2430), respectively, which in turn means that the I/O mask of the host PSW (2410) can always be loaded with "1" during the running of the OS. In this way, the situation never arises that the interrupts of the host and other OS are undesirably suspended or reserved in hardware.

The extended instruction executing circuit (2120) translates the input/output instruction of M-mode to the corresponding input/output start instruction of M/EX-mode with the aid of the device address translation, while the extended interrupt processing circuit 230 translates the interrupt of M/EX-mode to the interrupt of M-mode. Thus, the real computer of the M/EX-architecture can directly execute the input/output operation of the OS of M-mode. In this conjunction, a decision as to whether the running OS is of M-mode or not is effectuated by using the architecture identifiers (1510, 2303) upon the start of OS activation. Consequently, the processing for determining the architecture (mode) of the OS on the basis of the OS identifier is rendered unnecessary.

When the interrupt from the subclass dedicated to a running OS carries the interrupt information designated by the interrupt interception mask in the SD (1500), the interrupt processing circuit (2300) interrupts the host. Thus, by setting on the interrupt interception mask a pattern of the interrupt for which a recovery processing should desirably be performed on activating a corresponding OS, the host can conduct the recovery processing for the channel error and others.

The instruction execution circuit (2120) responds to the guest CR6 updating instruction issued by the OS of M/Ex-mode for updating also the mask value of the guest CR6 (2450) for the direct input/output execution by consulting the subclass number translation table (1540). Thus, even after the execution of the above-mentioned instruction, the guest interrupt activation circuit (2220) can still decide the condition for enabling the OS interrupt from the I/O mask of the guest PSW (2430) and the guest CR6 (2450) for the direct input/output execution. In this way, according to the invention, the guest CR6 (2240) updating instruction of the M/EX-mode OS can directly be executed without the need for interception thereof to the host.

BRIEF DESCRIPTION OF THE DRAWINGS

FIG. 5 is a diagram for illustrating an SRID instruction according to the invention;

FIGS. 7A and 7B show in combination a flow chart for illustrating execution of the TPI instruction according to the invention;

FIGS. 12A, 12B and 12C are views for illustrating an SD according to the invention;

FIG. 13 is a table diagram for illustrating information placed in a subchannel for execution of the SIOF instruction;

FIG. 17 is a table diagram for illustrating translation of the interrupt information according to a teaching of the invention;

FIG. 23 is a diagram for illustraing an SSCH instruction;

FIG. 24 is a diagram for illustrating a TSCH instruction;

FIG. 25 is a diagram for illustrating an interrupt code;

FIG. 26 is a diagram for illustrating an SIOF instruction;

FIG. 27 is a diagram for illustrating interrupt information of M-mode; and

DESCRIPTION OF THE PREFERRED EMBODIMENTS

In the following, the present invention will be described in detail in conjunction with preferred or exemplary embodiments by reference to the accompanying drawings.

Figure 1:
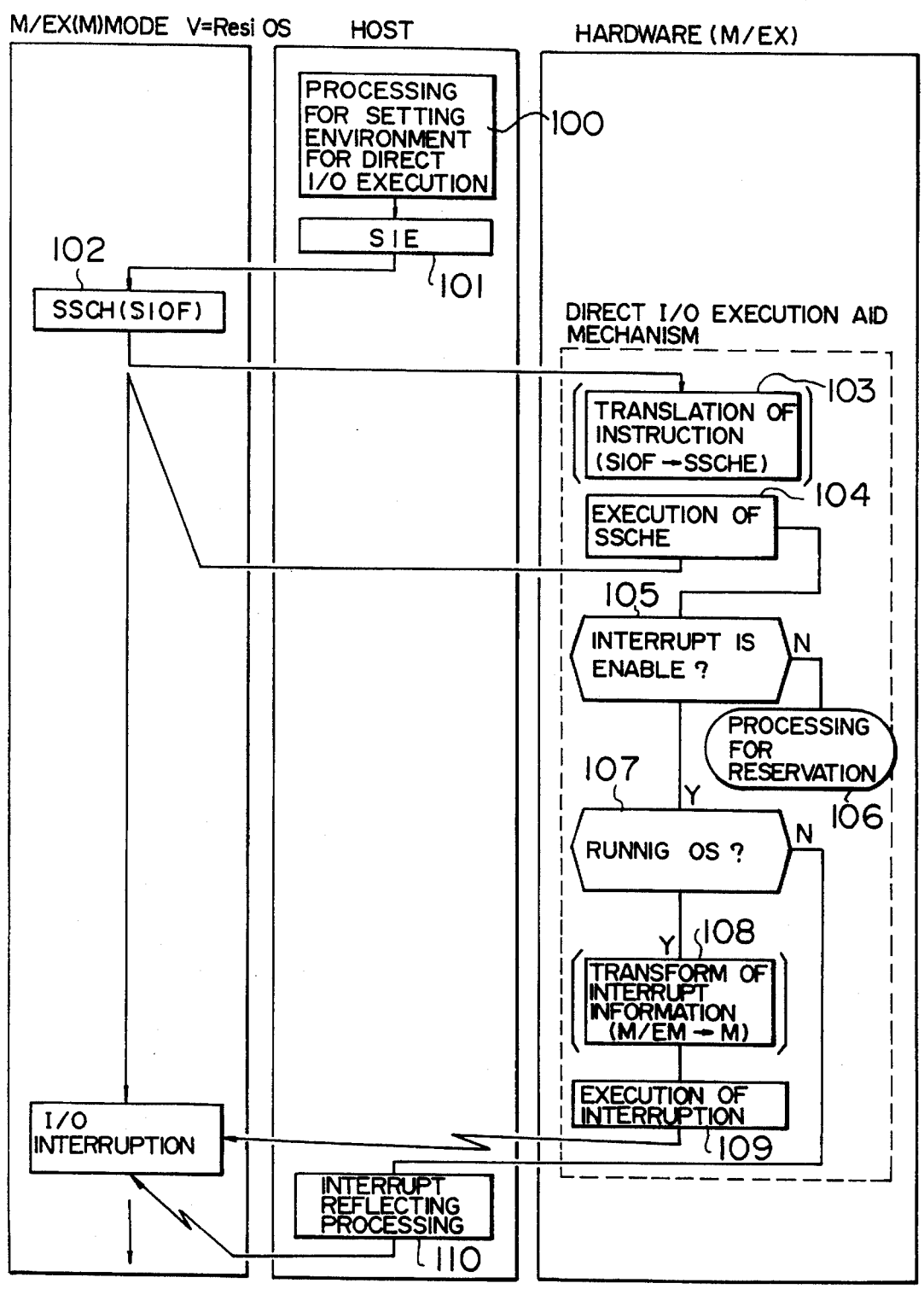
FIG. 1 is a flow diagram for illustrating generally operation of an input/output execution apparatus for a plural-OS run system according to an exemplary embodiment of the present invention.

FIG. 1 shows a functional flow chart for generally illustrating the operation of the input/output execution apparatus for a plural-OS run system according to an embodiment of the invention.

A primary object of the invention is to execute directly by hardware I/O (input/output) instruction and I/O interrupt to devices dedicated to OSs of M-mode and M/E-mode having respective resident storages without the need for intervention by a host.

In connection with the terminology adopted in description of the instant embodiment, the term "host" means control hardware for controlling a plurality of OSs (i.e. plural-OS control hardware means) in a plural-OS run system such as, for example, a logical partitioned system in which a plurality of OSs can run on a single computer under the control of the plural-OS control means, i.e. the host. In the case of the virtual machine system, however, the term "host" means a virtual machine control program.

In the flow chart shown in FIG. 1, the processing for executing the I/O instruction to a device and the I/O interrupt from a device dedicated to an OS is illustrated separately for the OS, the host and the hardware, respectively. At first, the host performs a processing for establishing environmental conditions for enabling the input/output execution at a step 100. At a step 101, the host issues an SIE instruction (Start Interpretive Execution instruction) and then dispatches an OS. Subsequently, when the OS issues an input/output instruction, the latter is executed in a manner described below. Incidentally, it should be mentioned in connection with FIG. 1 that instruction shown as enclosed in a parenthesis in a same column represents the instruction of M-mode, and that processing shown within a bracket represents the processing required only for the instruction of the M-mode, which processing is however not required for the instruction of the M/EX-mode.

When an OS of the M/EX-mode issues an SSCH instruction (Start Subchannel instruction) which is the input/output instruction at a step 102, a direct input/output execution supporting hardware mechanism executes a corresponding SSCHE instruction (Start Subchannel Extended instruction) which is newly provided according to the teaching of the invention and represents an instruction corresponding to the SSCH instruction of which function is extended, as will be described in detail hereinafter, whereby a group of CCWs (Channel Command Words) on a level-2 memory are executed. Upon issuance of an interrupt request after completion of the I/O processing, decision is then made by the hardware as to whether the interrupt is possible (enabled) or not (step 105). When the decision step 105 results in that the interrupt is impossible (disabled), the interrupt is reserved or suspended in the hardware (step 106). On the other hand, when the interrupt is enabled, decision is then made as to whether or not the interrupt of concern is of the sort which has to be informed to the running OS (step 107). If the result of the decision is affirmative (YES), the interrupt is directly executed by the hardware without intervention of the host (step 109). On the other hand, when the interrupt is not of the sort to be directly informed to the running OS, interrupt is first made to the host which then performs a processing reflecting the interrupt to the OS (step 110).

When the OS of M-mode issues an SIOF (Start I/O Fast Release) instruction which is the input/output instruction of that OS (step 102), the hardware performs instruction translation of SIOF-to-SSCHE for conditioning or setting the environment for the execution of the SSCHE instruction (step 103) and executes the SSCHE instruction (step 104). When an interrupt request makes appearance after completion of the above-mentioned I/O processing, the hardware makes decision as to whether the interruption is enabled or disabled (step 105). When the interruption is disabled, the interrupt of concern is reserved or suspended in the hardware (step 106). If the instruction is enabled, then decision is made as to whether the interrupt is of the sort to be informed to the running OS or not (step 107). When the result of this decision is affirmative, interrupt information of M-mode is generated from the interrupt information of M/EX-mode within the subchannel (step 108), being then followed by execution of the interrupt (step 109). On the other hand, when the interrupt is not of the sort to be directly informed to the running OS, interruption is first made to the host, which then performs the processing reflecting the interrupt to the OS (step 110).

In the following, an embodiment of the invention applied to the virtual machine system will be described in the section entitled "first embodiment" while that applied to the logical partitioned system will be described in the section "second embodiment".

(First Embodiment)

Figure 2:
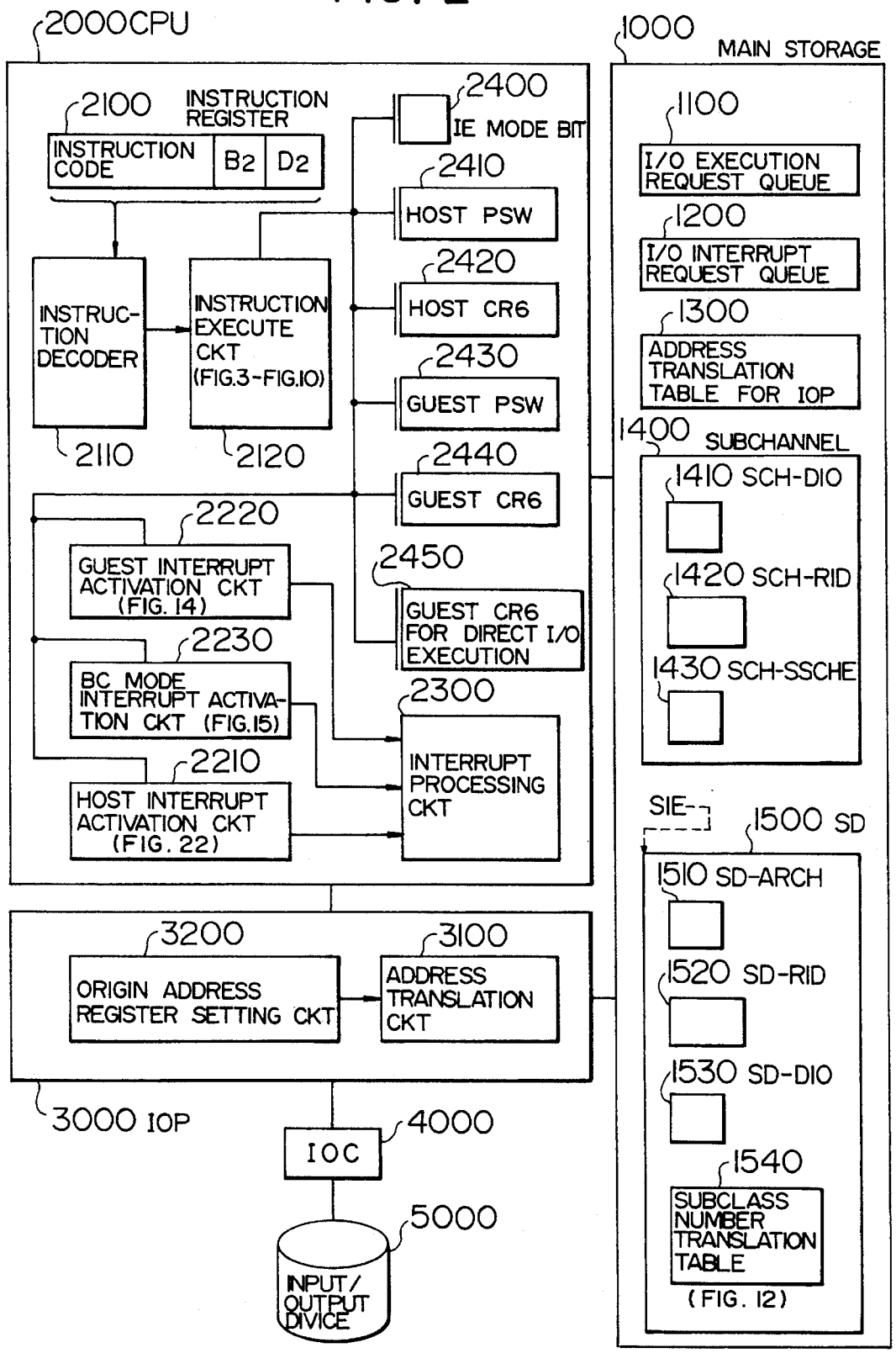
FIG. 2 is a block diagram showing a general arrangement of a virtual machine system according to a first embodiments of the invention.

FIG. 2 is a functional block diagram of a virtual machine system according to the first embodiment of the invention.

The structure of the system shown in FIG. 2 is substantially the same as that of the conventional system described hereinbefore by reference to FIG. 18 except for differences mentioned below.

(a) An SCH-SSCHE bit 1430 is provided within the subchannel 1400 for designating the SSCHE operation.

(b) A subclass number translation table 1540 is provided in the SD (State Description) 1500 to thereby extend the SD for the direct input/output execution.

(c) The instruction executing circuit 2120 is so extended as to be capable of executing the SIE instruction, an LCTL instruction for updating a control register and the I/O (input/output) instruction of VM.

(d) A direct I/O execution guest CR (Control Register) 6 designated by 2450 is provided for holding a mask of the subclass dedicated to the running VM.

(e) A guest interrupt activation circuit 2220 is provided for deciding the condition enabling the interrupt to the subclass dedicated to the running VM.

(f) A BC-mode interrupt activation circuit 2230 is provided to send unconditionally an activation signal to the interrupt processing circuit 2330 for the interrupt to the subclass dedicated to the VM running in the BC-mode (basic control mode). At this juncture, it should be mentioned that although the M/EX-mode is realized only in the EC-mode (extended control mode), the M-mode includes both the BC-mode and the EC-mode.

(g) An origin address register setting circuit 3200 is incorporated in the IOP (Input/Output Processor) 3000 for performing initialization for the input/output execution of VM.

Realized with the aid of the additionally provided mechanisms mentioned above are establishment of the environment for the direct input/output execution, activation of OS, execution of I/O instruction by OS, setting of the direct I/O executing guest CR6 and execution of the I/O interrupt.

Figure 3:
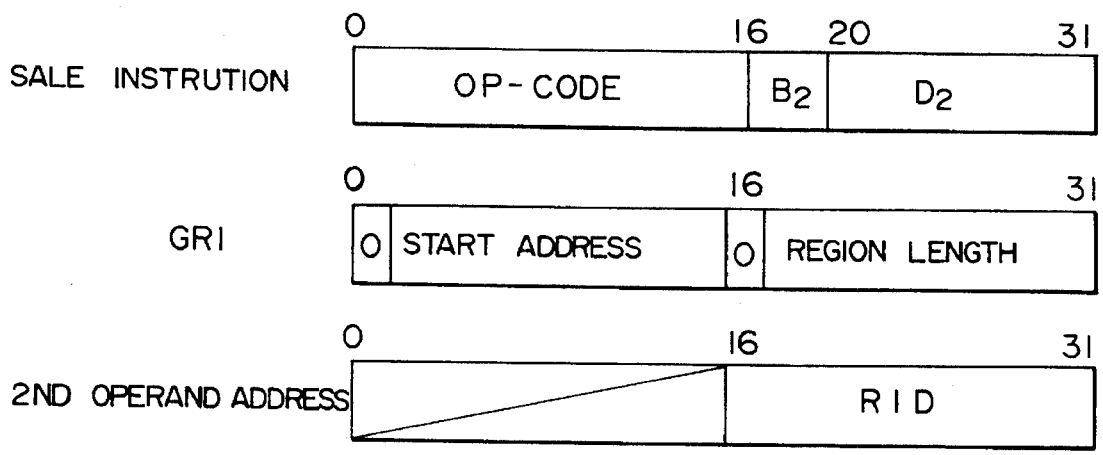
FIG. 3 is a diagram for illustrating an SALE instruction according to the invention.
Figure 4:
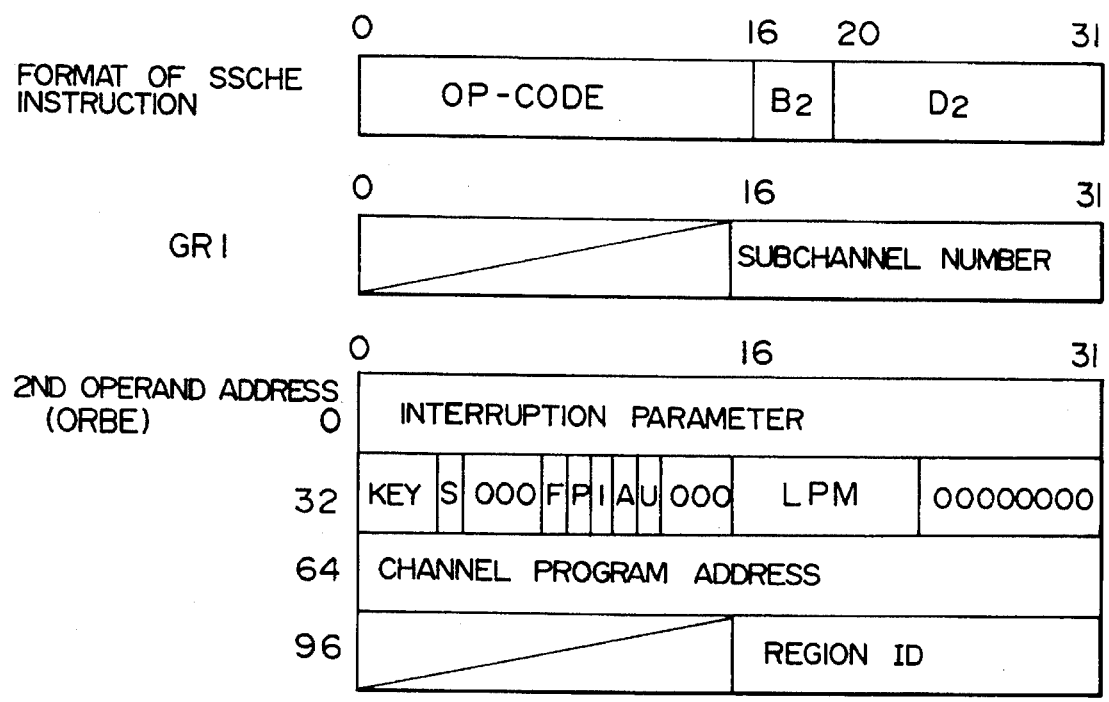
FIG. 4 is a diagram for illustrating an SSCHE instruction according to the invention.

FIGS. 3, 4 and 5 are views showing structures of a SALE (Set Address Limit Extended) instruction, the SSCHE instruction and an SRID (Set Region Identifier) instruction, respectively, which are newly provided according to the teaching of the invention.

(i) Processing for setting environment for direct input/output execution

The VMCP places the upper and lower limit addresses of the main storage of VM in the address translation table 1300 for the IOP with the aid of the SALE instruction newly provided according to the teaching of the invention. As is shown in FIG. 3, the second operand address of the SALE instruction is placed with a RID (Region Identifier) for allowing the IOP 3000 to identify the source VM issuing an input/output request. A value resulting from multiplication of a value of the start address including bits 1 to 15 of a general register GR1 with $2^{16}$ represents the start address (lower-limit address) of the main storage of the VM in the real main storage 1000, while a value resulting from multiplication of (n+1) (where n represents the length of region indicated in the GR1) with $2^{16}$ represents the region length of the main storage of the VM. Accordingly, a value which results from the multiplication of a sum of 1 (one), the start address and the region length of the GR1 with $2^{16}$ represents the end address (upper limit address) of the main storage of the VM.

When the VMCP issues the SALE instruction, this instruction is loaded in the instruction register 2100. The SALE instruction is decoded by the instruction decoder 2110, being followed by calculation for determining the second operand by the instruction execution circuit 2120, whereon the upper and lower limit addresses calculated from the start address and the region length indicated in the register GR1 are stored in the IOP address translation table 1300 at the entry for the RID (refer to the table shown in FIG. 19).

When an input/output device is to be connected to a VM as the device dedicated thereto, it is necessary to arrange such that the instruction execution circuit 2120 can identify the device as the objective for the direct input/output execution. To this end, an SRID (Set Region ID) instruction shown in FIG. 5 is newly provided according to the invention.

The SRID instruction has a second operand address containing the RID for allowing the instruction execution circuit 2120 to identify the VM to which the input/output device is dedicated and a DT bit indicating that a device is the objective for the direct input/output execution when the bit assumes "1", while indicating that the device is not the objective for the direct input/output execution when the bit assumes "0". Further, upon execution of instruction, the subchannel number of the input/output device to be set to the input/output execution mode is loaded in the general register GR1.

When the VMCP issues the above-mentioned SRID instruction, it is then loaded in the instruction register 2100. The instruction execution circuit 2120 calculates the second operand address, whereon the DT bit of a second operand address is loaded in the SCH-DIO 1410 of the subchannel 1400 corresponding to the subchannel number indicated by the register GR1, while the RID of the second operand address is placed in the SCH-RID 1420. In this manner, setting of the upper and lower limit addresses of the main storage region of the VM for the IOP address translation table 1300 as well as the setting of the RID of the VM to which the input/output device for the direct input/output execution is to be dedicated are realized.

Further, as the environment setting processing, there are required the subclass dedication processing, preparation of a device address translation table 1551 described hereinafter for the VM of M-mode and other processings. Since these processings are closely related to the SD 1500, detailed description will be made below in conjunction with the VM activation processing.

(ii) OS activation processing

Figure 12A:
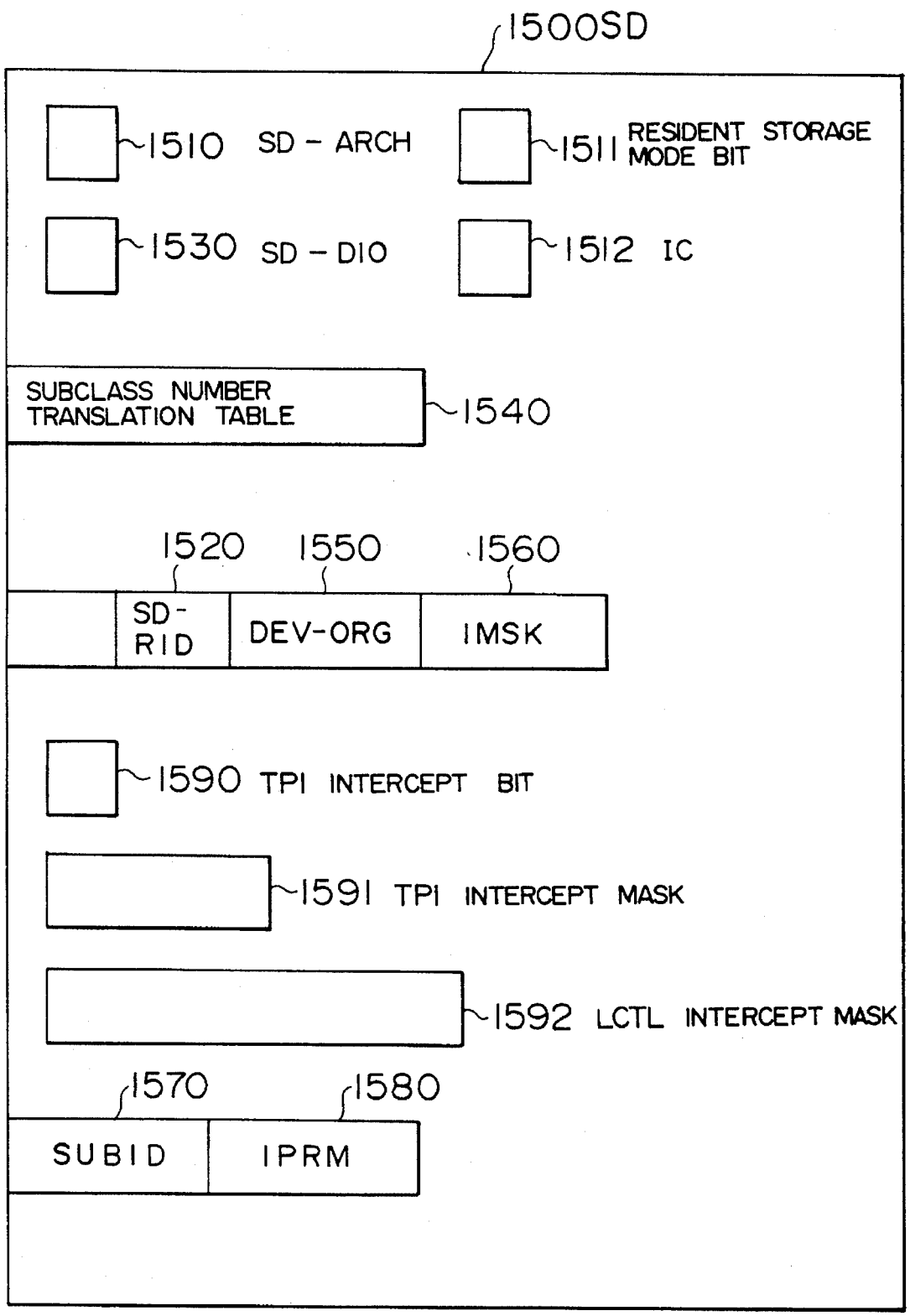

FIGS. 12(A), 12(B) and 12(C) are views for illustrating the SD region taught by the invention.

The SD 1500 which is an operand of the SIE instruction for activating the VM includes fields mentioned be low.

(a) SD-ARCH 1510

This is an operand used also in the conventional system. When this operand assumes "0", it indicates the activation of the VM of the M-mode, while "1" of the operand indicates the activation of the VM of the M/EX-mode.

(b) Resident storage mode bit 1511

This is an operand also existing in the conventional system.

The value "0" of this operand indicates the activation of the VM of non-resident storage mode, while "1" indicates the activation of the VM of resident storage mode.

(c) IC bit 1512

This operand also exists in the conventional system. When a program interrupt request of instruction exception in the course of running of VM, the IC bit 1512 of "0" informs the VM of a direct program interrupt while the IC bit of "1" indicates the interruption to the VMCP.

(d) LCTL intercept mask 1592

This operand also exists in the conventional system and consists of 16 bits, wherein individual bits correspond to the control register numbers. Even when the VM issues the control register value translation instruction LCTL, execution of this instruction is suppressed and intercepted to the VMCP, when the instruction as issued includes alteration of the control register having the LCTL intercept mask 1592 set to "1".

(e) SD-DIO 1530

This is an operand newly provided according to the invention. When this operand is "0", it means that the direct input/output execution is not performed, while indicating that the direct input/output execution is performed when the operand is "1".

(f) Subclass number translation table 1540

This is an operand newly provided according to the invention and is composed of 8 entries, each consisting of SCL-CNTL (subclass control field) shown in FIG. 12(C), which has the implications mentioned below in dependence on the architecture of VM indicated by the SD-ARCH 1510.

I. In the case of VM of M-mode (A) When the SD-DIO 1530 is "0", the VM has no subclass for the direct input/output execution.

(B) When the SD-DIO 1530 is "1", this means that the VM has a subclass for the direct input/output execution. The zero-th entry SCL-CNTL of the subclass number translation table 1540 has S bits (bits 3 to 7) which indicate the real subclass number dedicated to the VM (the real subclass is set in the corresponding subchannel by the VMCP upon dedication of the device) and D bit (bit 0) which indicates the value of the mask set for the above-mentioned subclass. By way of example, when the subclass number translation table 1540 has the entry of $(8100000000000000)_{16}$, the real subclass 1 is dedicated to the VM of concern and the mask value of "1" is set for the real subclass 1.

II. In the case of VM of M/EX-mode

When D=0, the guest input/output interrupt subclass corresponding to the number of the relevant entry is not set in correspondence relation to the I/O interrupt subclass for the direct input/output execution.

When D=1, the guest I/O interrupt subclass corresponding to the number of the relevant entry is set in correspondence relation to the I/O interrupt subclass for the direct input/output execution.

The bit S (bits 3 to 7) represents the number of the I/O interrupt subclass for the direct input/output interrupt execution allocated to the guest. By way of example, when the subclass number translation table 1540 has the entry of $(8200840000000000)_{16}$, the virtual subclass 0 is set to correspond to the real subclass 2, and the virtual subclass 2 is set to correspond to the real subclass 4, while indicating that the real subclasses 2 and 4 are dedicated to the VM of concern.

Upon the issuance of the SIE instruction, the instruction execution circuit 2120 sets the guest CR6 2450 for the direct input/output execution in accordance with the subclass number translation table 1540, as will hereinafter be described in detail.

(g) SD-RID 1520

This is an operand which is newly provided according to the invention and serves to set the VM identifier RID for aiding or supporting the direct input/output execution. The SD-RID 1520, the RID designated upon setting of the upper and lower limit addresses of the main storage region of the VM of concern under the command of the SALE instruction and the RID designated by the SRID instruction upon dedication of device to the VM of concern have to be identical with one another. The $RID_s$ differs from one to another VM and are managed by the VMCP.

(h) DEV-ORG 1550

This operand is newly provided according to the invention and indicates the start address of the device address translation table 1551 described hereinafter. The value of this field is validated only when the guest is of M-mode and when the SD-DIO 1530 is "1".

As can be seen in FIG. 12 (B), the device address translation table 1551 is constituted by $(2000)_{16}$ entries DEVTBLs, wherein the entry number represents the virtual input/output device address which is an operand of the input/output instruction of M-mode. Referring to FIG. 12(B), DEVTBL has fields imparted with the implications mentioned below.

When the field D is "0", this means that the device of concern is not the objective for the direct input/output execution. When D="1", this means that the device of concern is the objective for the direct input/output execution. When a VM of M-architecture issues the input/output instruction (SIOF instruction) of the virtual input/output device address corresponding to the entry number, execution of the input/output instruction (SSCH instruction) of M/EX-architecture is commanded to the subchannel designated by the DEVTBL by using a logical path mask LPM designated by the DEVTBL.

When an input/output device is dedicated to a VM of the M-mode, the VMCP sets to "1" the D bit of the relevant entry DEVTBL of the device address translation table 1551 and additionally sets the LPM and the subchannel number. Concerning the direct input/output execution of the VM of the M-mode by using the device address translation table, description in detail will be made later on in the section (iii).

(i) I/O interrupt interception mask IMSK 1560

This operand is also newly provided according to the invention. The IMSK 1560 corresponds to the subchannel status word SCSW representative of the end status information of the input/output instruction of the M/EX-mode. The SCSW of the input/output interrupt capable of being directly executed by VM and the value of the I/O interrupt interception mask IMSK are logical ANDed on a bit basis, wherein when both one of the SCSW and the IMSK is "1", the I/O interrupt is not directly executed but intercepted to the VMCP. This interception is referred to as the I/O interrupt interception. Concerning how to realize the I/O interrupt interception, description in detail will be made later on in the section (v).

(j) SUBID 1570 and IPRM 1580

Also these operands are newly provided according to the invention. Upon occurrence of the I/O interrupt interception, the relevant subchannel number is set at the subchannel identifier or SUBID 1570, while the interrupt parameters designated by the operands of the input/output instruction for the relevant subchannel are placed in the IPRM 1580.

(k) TPI intercept bit 1590 and TPI intercept mask 1591

These operands are also newly provided according to the invention and are used for directly executing the TPI instruction of VM of the M/EX-mode, as hereinafter described in detail in the section (iii).

By issuing the SIE instruction having as the operand the extended SD 1500 mentioned hereinbefore according to the invention, the instruction execution circuit 2120 and the interrupt processing circuit 2300 can make reference to and/or update the value of the above-mentioned operand of the running VM.

(iii) Execution of I/O instruction of VM (iii-1) Execution of I/O instruction by VM of M/EX-mode description will briefly by made of bare machine oriented specifications of TPI (Test Pending Interrupt) instruction, STCPS (Store Channel Path Status) instruction, TSCH (Test Subchannel) instruction and RSCH (Resume Subchannel) instruction which are directly executable I/O instructions of the M/EX-architecture or mode.

(a) TPI instruction

With this instruction, the interrupt code of a subchannel for which the I/O interrupt is reserved in the subclass designated by the subclass masks having the value "1" of the control register CR6 is stored at a region designated by the second operand address. The interrupt code consists of $(+0001)_{16}$, a subchannel number and an interrupt parameter, as is shown in FIG. 25.

(b) STCPS instruction

With this instruction, the channel path status word indicating the active status of channel path is stored at a region or area designated by the second operand address.

(c) TSCH instruction

As shown in the format diagram of FIG. 24, the TSCH instruction is composed of an operation code, a second operation address of ($B_2/D_2$) and a subchannel number placed in the general register GR1. The TSCH instruction serves as an instruction for storing the interrupt information of the subchannel designated by the general register GR1 in the main storage at a region designated by the second operand address. Parenthetically the TSCH instruction is shown in FIG. 24 in the format of an interrupt response block (IRB). The IRB consists of a subchannel status word (SCSW) which is extended information of the channel status word, an extended status word (ESW) corresponding to a limited channel log-out (LCL) of M-mode and an extended control word (ECW) including monitor information and the like.

(d) SSCH instruction

The SSCH instruction is of such a format as shown in FIG. 23. It is required that ORB (Operation Request Block) which is one of the input/output control information be previously stored in the main storage at a region designated by the second operand address ($B_2/D_2$), which operation will be described hereinafter.

The general register GR1 is loaded with the subchannel number designating the input/output device which is the objective for the input/output execution.

In a lower half of FIG. 23, there is shown in detail a structure of the operation request block (ORB) comprising 12 bytes. An interrupt parameter field can be freely used by program without any restriction to the content. A subchannel key corresponds to a protection key contained in the CAW of M-mode, while a channel program address corresponds to that contained in the CAW of M-mode except for difference that the former is extended to 31 bits. A bit F serves for controlling the format of the CCW. When the bit F is "0", this indicate execution of the CCW of a format 0 in which the data address is of 24 bits. On the other hand, the bit F of "1" indicates execution of format 1 where the data address is of 31 bits. The logical path mask LPM defines a range of the channel path participating in the input/output execution. By setting only one of eight bits constituting the LPM to "1", the input/output operation is executed only by the corresponding one channel path. On the other hand, a plurality of bits of LPM are set to "1", the IOP 3000 selects a non-occupied one of the corresponding channel path for execution of the input/output operation. Other bits S, P, I, A and U are control bits for the functions added in the M/EX-mode. For more particulars of these bits, reference may be made to the literatures cited hereinbefore.

(e) RSCH instruction

When a group of CCW started execution in response to the SSCH instruction are suspended on the way of execution, the RSCH instruction serves to resume the $CCW_s$ remaining to be executed. The subchannel number of the device for which the $CCW_s$ are to be resumed is designated in the general register GR1.

Now, referring to FIGS. 6 and 7, detailed description will be made of methods of executing the TPI instruction, STCPS instruction, TSCH instruction, SSCH instruction and the RSCH instruction issued by VM.

Figure 6:
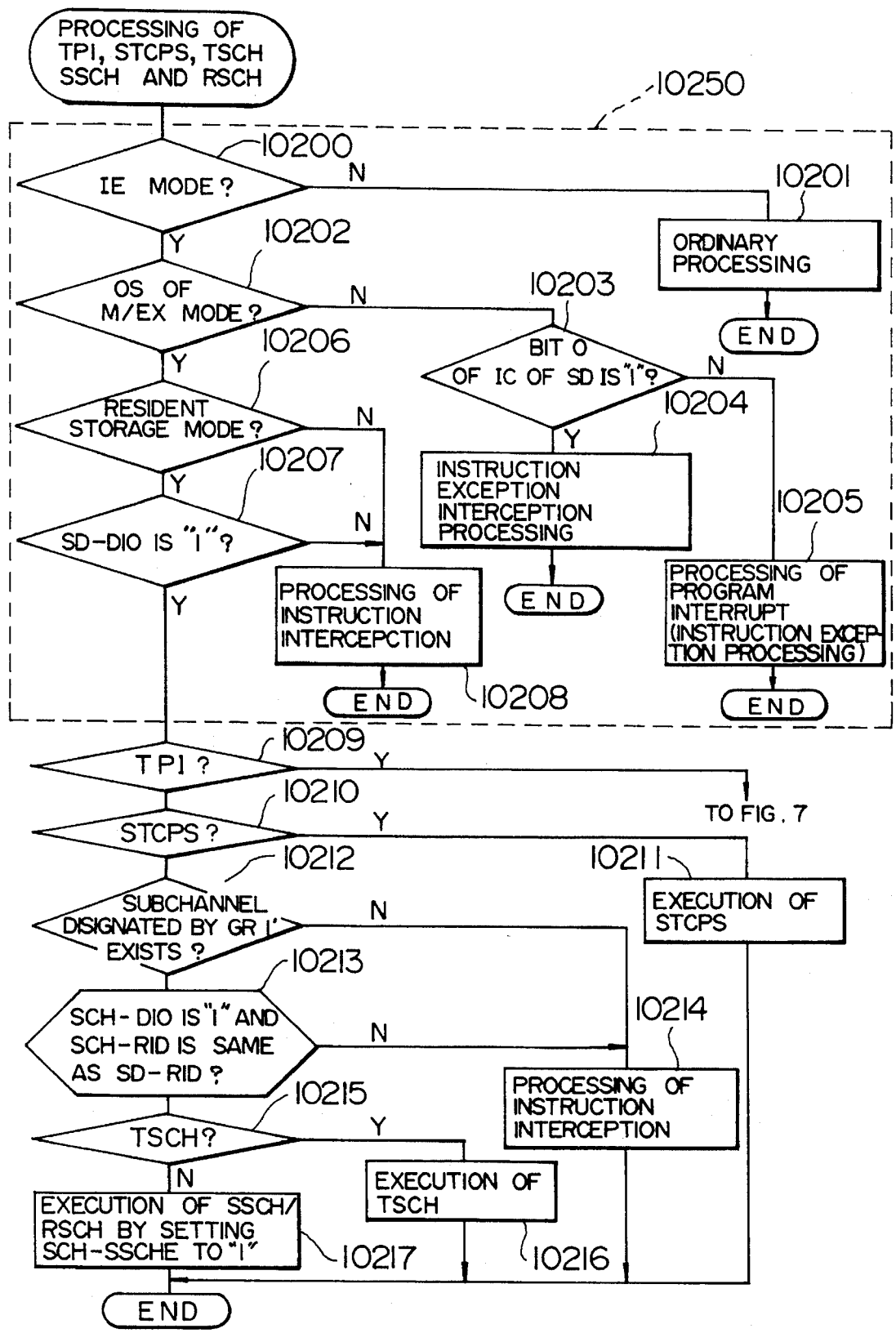
FIG. 6 is a flow chart for illustrating execution of a TPI instruction, an STCPS instruction, a TSCH instruction, an SSCH instruction and an RSCH instruction.

FIG. 6 is a flow chart for illustrating the execution of the TPI instruction, STCPS instruction, TSCH instruction, SSCH instruction and the RSCH instruction issued by an OS according to the invention, and FIG. 7 is a flow chart illustrating in detail the execution of the TPI instruction according to the invention.

First Exemplary Realization of TPI Instruction (a) Decision is made as to whether any VM is running or not by checking whether the IE-mode bit 2400 is "1" or not (step 10200). When the IE-mode bit 2400 is "0" indicating that no VM is running, the TPI instruction is executed (step 10201) to complete the execution of instruction.

(b) Decision is made as to whether or not the TPI instruction issued by the VM of M/EX-mode by checking whether SD-ARCH 1510 of the SD 1500 is "1" or not (step 10202), wherein when the SD-ARCH 1510 is "0", the processing proceeds to the next step (c). Further, it is decided whether the IC 1512 of the SD 1500 shown in FIG. 12(A) is "1" or not (step 10203). When it is "1", this means an instruction exception interception, whereon interruption is made to the VMCP (step 10240). On the other hand, when the IC 1512 is "0", a program interrupt (instruction exception) is informed directly to the VM (step 10205). Thereafter, execution of the instruction is ended.

(c) Next, decision is made as to whether the VM is of the resident storage mode or not by checking whether or not the resident storage mode bit 1511 shown in FIG. 12(A) is "1" (step 10206). When the resident storage mode bit 1511 is "0", execution of the instruction is suppressed as the instruction interception, whereon interruption is made to the VMCP (step 10208).

(d) It is decided whether or not the VM is the objective for the direct input/output execution by checking whether the SD-DIO 1530 of the SD 1500 is "1" or not In case the SD-DIO 1530 is "0" interruption is made to the VMCP as the instruction interception.

(e) Decision is made as to whether the TPI intercept bit 1590 shown in FIG. 12 (A) is "1" or not (step 10300). When this bit is "1" interruption is made to the VMCP as the instruction interception (step 10309). Parenthetically, the TPI interception bit 1590 is set to "1" by the VMCP when the latter reserves the I/O interrupt of the relevant VM. The intercepted TPI instruction is simulated by the VMCP.

(f) Next, "0" is placed in a register i for counting the real subclass number (step 10301).

(g) It is then decided at a step 10302 whether the bit i of the guest CR6 2450 for the direct input/output execution is "1" or not. When this bit i is "0", the bit i is incremented by 1 (one) at a step 10306.

(h) When the bit i is "1", it is decided whether or not the interrupt is pending in the real subclass i by checking whether the bit i of the real interrupt reserving register 2214 is "1" or not (step 10303). When the bit i is "0", this bit is incremented by 1 (one) at a step 10306.

Figure 21:
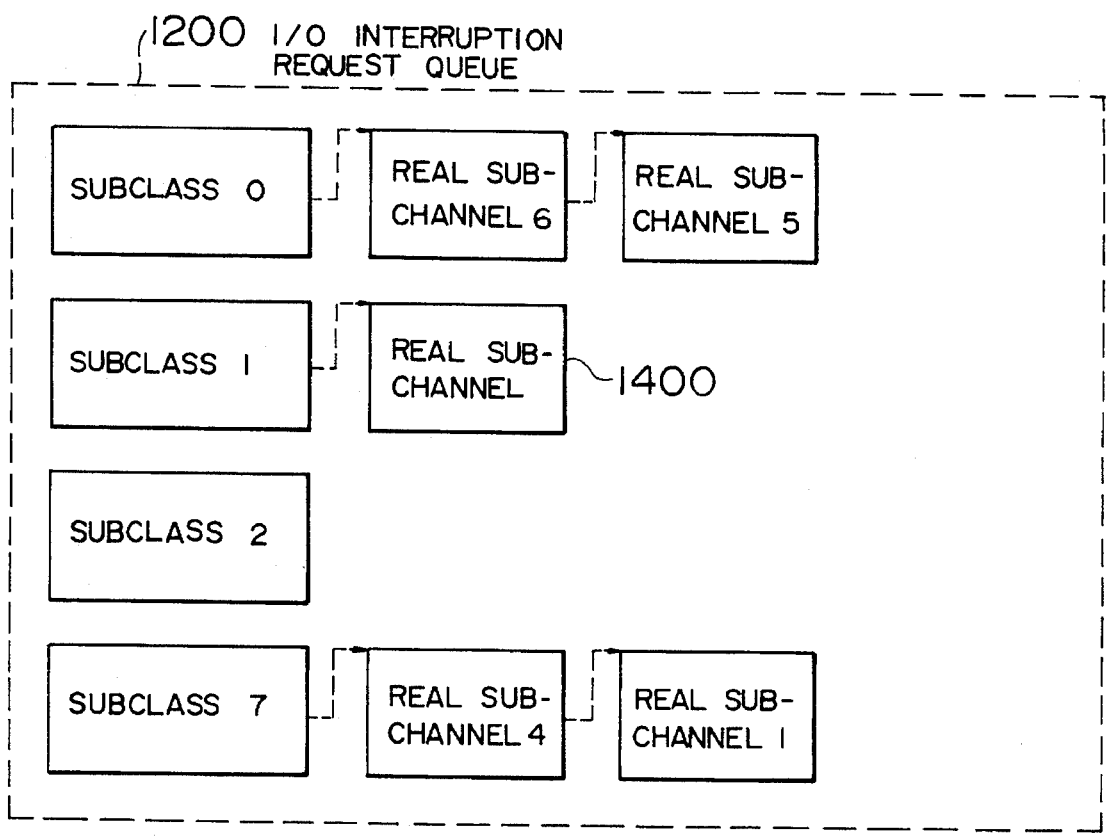
FIG. 21 is a diagram for illustrating an I/O interrupt request queue.

(i) When the bit i is "1" the leading subchannel 1400 queued in the subclass i of the I/O interrupt request queue 1200 shown in FIG. 21 is released from that queue 1200 and the interrupt code (FIG. 25) of the relevant subchannel is stored in the main storage of the VM shown at the region indicated by the general purpose register GR1 (step 10340).

(j) Next, the condition code 1 is set (step 10305), whereupon execution of the instruction comes to an end.

(k) After the incrementation of the bit i by 1 at the step 10306, it is decided whether or not the bit i is smaller than 8 at a step 10307. If so, the step 10302 is resumed.

(l) On the other hand, when the bit i is greater than 8, inclusive, the condition code CC is set to "0" at a step 10308, whereon execution of the instruction comes to an end.

In this manner, according to the teaching of the invention incarnated in the first example described above, the TPI instruction of VM can directly be executed when the TPI interception bit 1590 is "0".

Second Exemplary Realization of TPI Instruction Execution

Figure 7B:
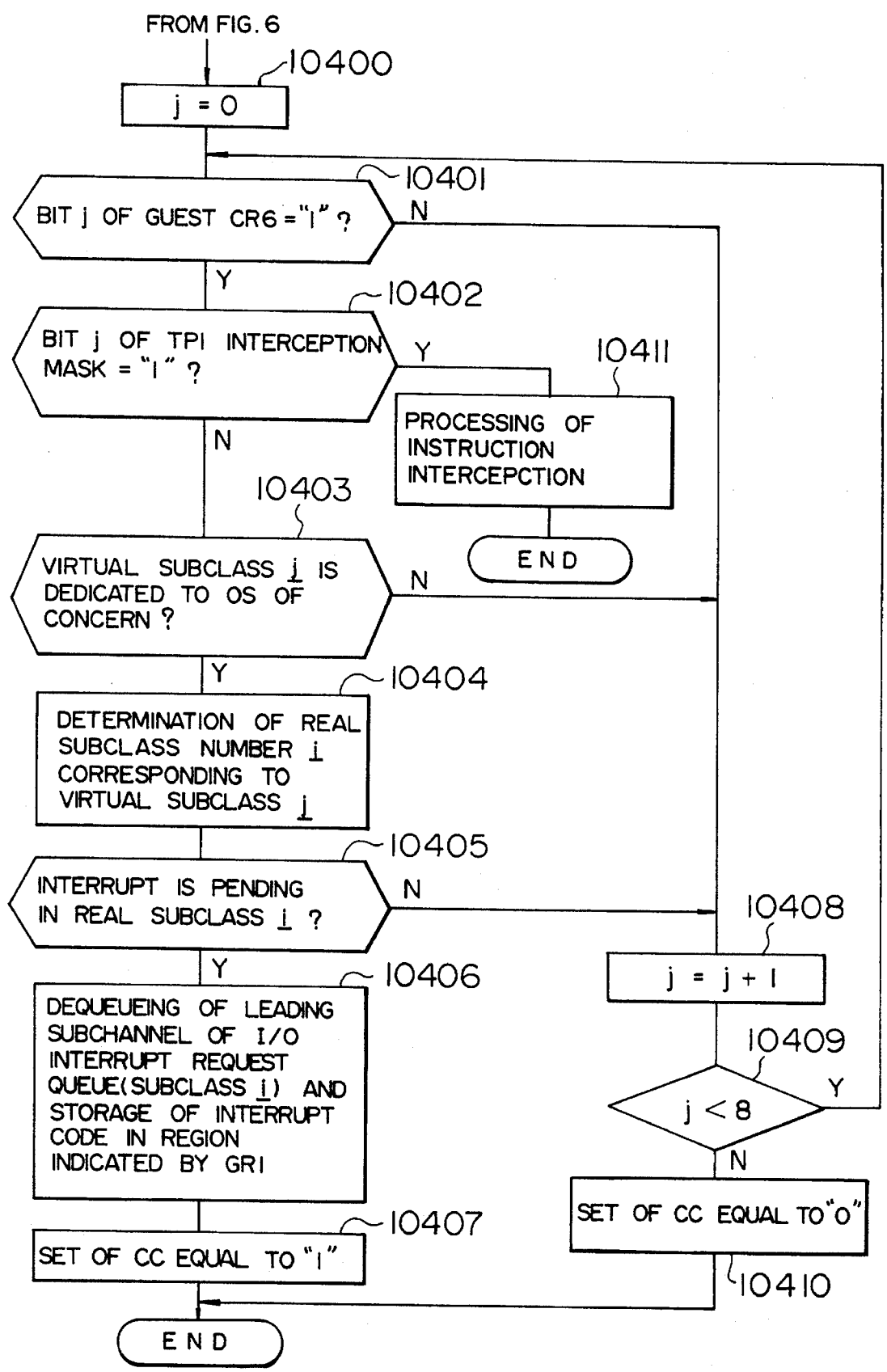

In FIG. 6, the processings shown enclosed in a dashed line block are common to both the first and second exemplary realizations of TPI instruction. In other words, the processings (a) to (d) of the second exemplary realization of the TPI instruction are formed in the same manner in the case of the first exemplary realization of the instruction TPI. Accordingly, the following description made by reference to FIG. 7(B) is directed to processings (e) et seq. which succeed to the processing (d).

(e) The register j for counting the virtual subclass number is placed with "0" (step 10400).

(f) It is decided whether the bit j of the guest CR6 2440 is "1". If the bit j is "0", this bit is added with 1 (one) at a step 10408.

(g) On the other hand, when the bit j of the guest CR6 2440 is "1", decision is then made as to whether the bit j of the TPI intercept mask 1591 of the SD 1500 shown in FIG. 12(A) is "1" or not at a step 10402. When the bit j of the TPI intercept mask 1591 is "1", the instruction interception is issued to the VMCP at a step 10411, which respond thereto by setting the I/O interrupt reservation state at the TPI intercept mask for each subclass of the relevant VM and dispatching the VM. By way of example, when the interrupt of virtual subclasses 0 and 4 of the VM which is to run are reserved in the VMCP, $(88)_{16}$ is set at the TPI intercept mask.

(h) When the bit j of the TPI intercept mask 1591 is "0", decision is made as to whether or not the virtual subclass j is the one dedicated to the subclass for the direct input/output execution of the relevant VM by checking whether the bit 0 (i.e. D-bit) of the j-th SCL-CNTL entry is "1" or not (step 10403). When the D-bit is "0", the bit j is added with 1 (one) at a step 10408.

(i) When the D-bit is "1", this means that the virtual subclass is the one dedicated to the VM of concern. Accordingly, the real subclass number i corresponding to the virtual subclass j is determined by referring to the bits 3 to 7 (S-field) of the j-th SCL-CNTL entry of the subclass number translation table 1540 (step 10404).

(j) Next, it is decided whether or not any interrupt is reserved in the real subclass i by checking whether the bit i of the real interrupt reserving register 2214 (see FIGS. 14 and 15) is "1" at a step 10405. When the bit i of the interrupt reserving register 2214 is "0", the bit j is added with 1 (one) at a step 10408.

(k) On the other hand, when the bit i of the real interrupt reserving register 2214 is "1", this means that interrupt is reserved or pending in the real subclass i. Accordingly, the leading subchannel 1400 (see FIG. 21) queued in the subclass i of the I/O interrupt request queue 1200 is released therefrom and the interrupt code (see FIG. 25) of the relevant subchannel is stored in the main storage of the VM at the region indicated by the general register GR1 (step 10406).

(l) Next, the condition code CC is set to "1" at a step 10407, whereon the execution of the instruction is ended.

(m) After the addition of "1" at the step 10408, it is decided whether or not the bit j is smaller than 8 at a step 10409. If so, the step 10401 is resumed.

(n) On the other hand, when the bit j is greater than or equal to 8, the condition code CC is set to "0" at a step 10410, whereon the execution of the instruction comes to an end.

In this way, according to the second example of the TPI instruction execution described above, the TPI instruction of VM is placed in the state ready for the direct execution in accordance with the control of the TPI intercept mask 1591.

Exemplary Realization of STCPS Instruction Execution

In the case of execution of the STCPS instruction, the processings (a) to (d) of the first example of the TPI instruction execution which are shown in the broken line block in FIG. 6 are performed in the same manner. Accordingly, repeated description of these processings will be unnecessary. Of course, in the description of the processings (a) to (d) in the first example of the TPI instruction execution, "TPI instruction" should be replaced by "STCPS instruction" in the case of the instant example. The following description is thus directed to the processings succeeding to the processing (d).

(e) The STCPS instruction is executed (step 10211), and the channel path status word is stored in the main storage of the VM. Execution of the instruction then comes to an end.

Exemplary Realization of TSCH Instruction Execution

The same processings as those (a) to (d) in the first example of the TPI instruction execution (the processing shown within the phantom line block in FIG. 6) are also performed in the case of the instant example. Of course, the phrase "TPI instruction" appearing in the description of the first example must be replaced by "TSCH instruction". The following description is directed to the processings performed in succession to the processing (d).

(e) Decision is made as to whether there is present the subchannel whose number is designated by the general register GR1 (step 10212). Unless the subchannel of concern exists, execution of the instruction is suppressed and the instruction interception is issued to the VMCP (step 10214).

(f) Decision is made as to whether the SCH-DIO 1410 of the subchannel 1400 designated by the general purpose register GR1 is "1" and whether the SCH-RID 1420 coincides with the SD-RID 1520 (step 10213). When these conditions are not satisfied, an instruction interception is issued to the VMCP (step 10214).

(g) The TSCH instruction is executed (step 10216), and the interrupt response request block (IRB) of the relevant subchannel 1400 is stored in the main storage of the VM at the region designated by the second operand address, whereupon execution of this instruction comes to an end.

Exemplary Realization of SSCH Instruction Execution

The processings (a) to (f) in the execution of the TSCH instruction are performed in the same manner also in the case of the instant example. Of course, "TSCH instruction" appearing in the description of these processing should read "SSCH" in the instant case. The following description is directed to the processings to be performed in succession to the processing (f) in the execution of the TSCH instruction.

(g) after placing "1" at the SCH-SSCHE 1430 of the relevant subchannel 1400, the instruction is executed at a step 10217, whereon the execution of this instruction is ended.

Subsequently, the IOP 3000 executes the channel program designated by the instruction, which will be described in detail later on.

Exemplary Realization of RSCH Instruction Execution

The processings (a) to (f) performed in the execution of the TSCH instruction are carried out in the same manner. Accordingly, the description of these processings holds true to the execution of the RSCH instruction except that "TSCH instruction" be replaced by "RSCH instruction". Accordingly, the following description concerns only the processing succeeding to (f).

(g) The RSCH instruction is executed for the relevant subchannel 1400 at a step 10217, whereupon the execution of this instruction comes to an end.

Execution of Channel Program

Figure 11:
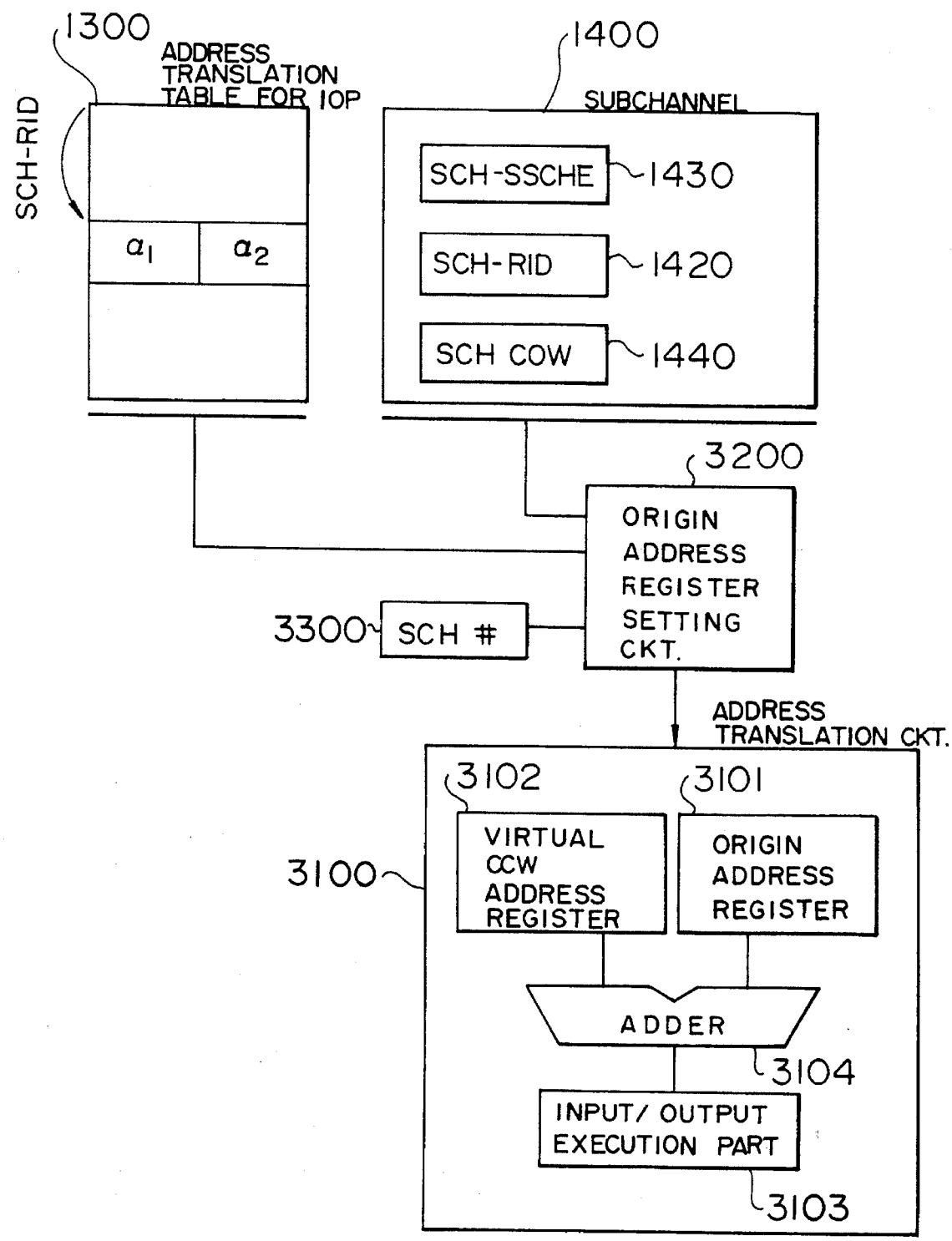
FIG. 11 is a functional diagram for illustrating execution of virtual CCWs according to the invention

FIG. 11 is a view for illustrating execution of the virtual CCWs according to the invention.

Referring to FIG. 11, description will be made in detail of a manner in which the virtual CCWs at the level-2 address of the VM of the resident storage mode are executed by the IOP 3000.

In FIG. 11, a reference numeral 3200 denotes an origin address register setting circuit newly provided according to the invention. The address translation circuit 3100 is a sort of channel device such as disclosed, for example, in JP-A-60-122445.

At the time when an input/output activation signal is sent to the IOP 3000 from the CPU 2000, the number of the subchannel for the input/output activation is loaded in the subchannel number register SCH #3300. Subsequently, the origin address register setting circuit 3200 places the value of the SCH-CCW in the subchannel designated by the SCH #3300 (the value representing the CCW address placed in ORB shown in FIG. 23 upon execution of the SSCH instruction) in the virtual CCW address register 3102 incorporated in the address translation circuit 3100. Further, "0" is placed in the origin address register 3101, while when the SCH-SSCHE 1430 is "0", the lower limit address $\alpha_i$ of the input/output execution requesting VM registered in the address translation table 1300 for the IOP corresponding to the SCH-RID 1420 is placed in the origin address register 3101, whereupon an activation signal is sent to the address translation circuit 3100. Thereafter, the address translation circuit 3100 performs the operation which is described in JP-A-60-122445. In other words, the values of the virtual CCW address register 3102 and the origin address register 3101 are added together by an adder 3104, the resulting sum being inputted to the input/output execution part 3103 as the real address of the CCW. The input/output execution part 3103 carried out.

Next, description will be turned to the SSCHE (Start Subchannel Extended) instruction for allowing the VMCP to execute directly the virtual CCWs. The SSCHE instruction designates the subchannel number in the general register GR1 at bits 16 to 31 thereof as in the case of the SSCH instruction. Further, stored at the region of the main storage indicated by the second operand address is ORBE (ORB Extended) which corresponds to an extension of the operation request block (ORB). The ORBE consists of 16 bytes, as seen in FIG. 4, and differs from the ORB in that the field for the RID is provided and that the CCW address is the level-2 address.

Upon issuance of the SSCHE instruction, the instruction execution circuit 2120 places "1" in the SCH-SSCHE 1430 of the relevant subchannel in addition to the execution of the processing performed in response to the SSCH instruction, while the RID designated by the ORBE is placed at the SCH-RID 1420. Subsequently, the virtual CCWs of the level-2 address are executed through cooperation of the origin address setting circuit 200 newly provided according to the invention and the address translation circuit 3100, as is shown in FIG. 11.

(iii-2) I/O execution by VM of M-mode

In the M-mode architecture, seven input/output instructions are available, a typical one of which is the SIOF (Start I/O Fast Release) instruction. As shown in FIG. 26, the SIOF instruction consists of an operation code and operand addresses, wherein the bits 16 to 31 having a value ($B_2/D_2$) resulting from the addition of the content of the base register $B_2$ with the value of the displacement $D_2$ indicates the address of the input/output device for executing the input/output operation. Assuming, by way of example, that the result of addition of $D_2$ to the content of $B_2$ is $(00000123)_{15}$, this means that the input/output operation is to be executed for the input/output device having the address 123, i.e. the input/output device in the input/output path having the channel number 1 and the unit address $(23)_{16}$. Further, as shown in FIG. 27, the leading or start address of the channel command word CCW describing the details of input/output operation and a protection key are stored in a region of 4 bytes referred to as the channel address word (CAW) in succession to the address 72 of the main storage. Besides, the designated CCW is a CCW of the so-called format O, in which the intra-CCW address field for data for the input/output operation is constituted by 24 bits. When the value of the bit 0 of the control register CR0 (for block multiple control) is "0", the SIOF instruction serves as the SIO (Start I/O) instruction.

Exemplary Realization of SIOF Instruction Execution

Figure 8A:
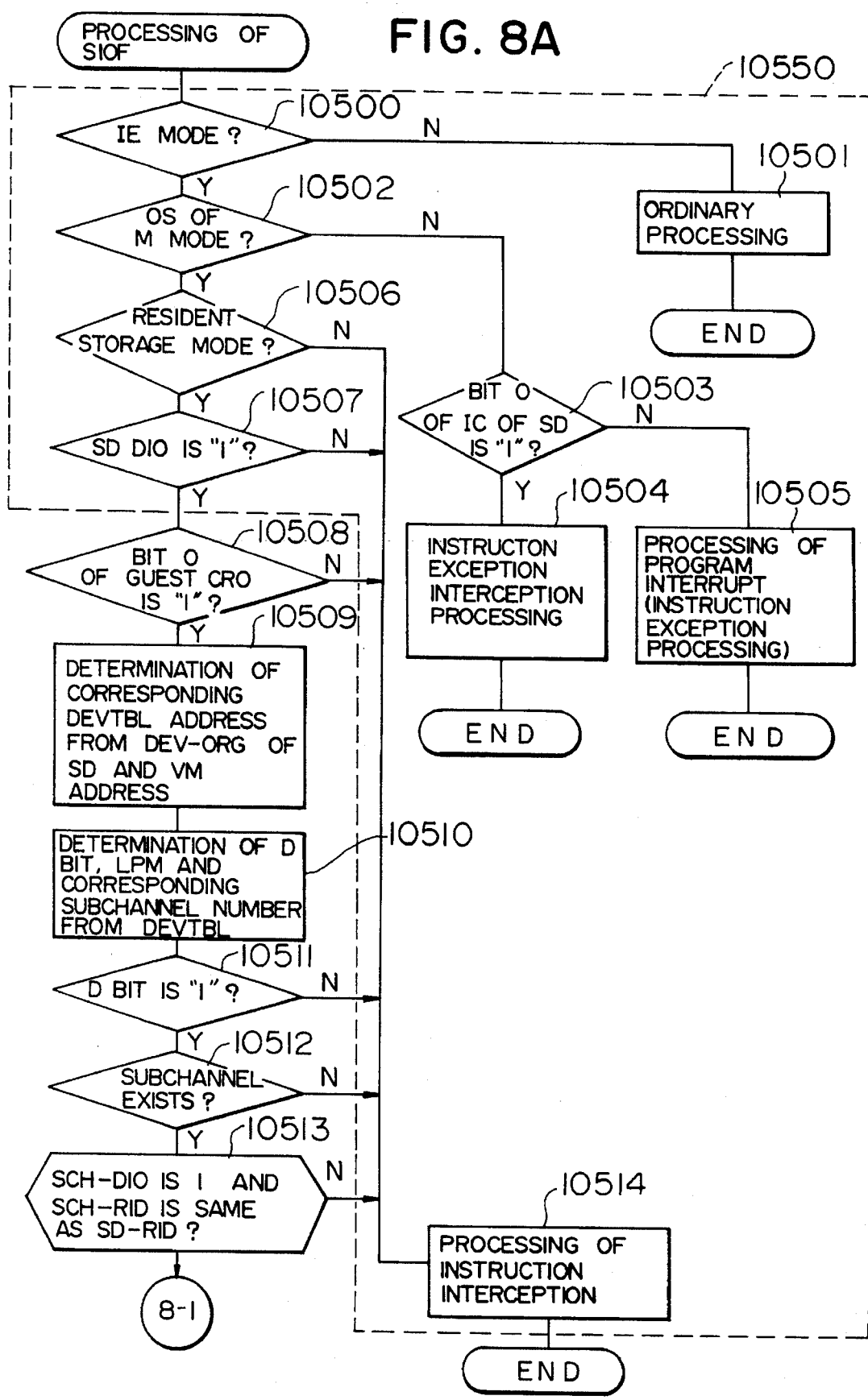
FIGS. 8A and 8B show in combination a flow chart for illustrating execution of an SIOF instruction according to the invention.
Figure 8B:
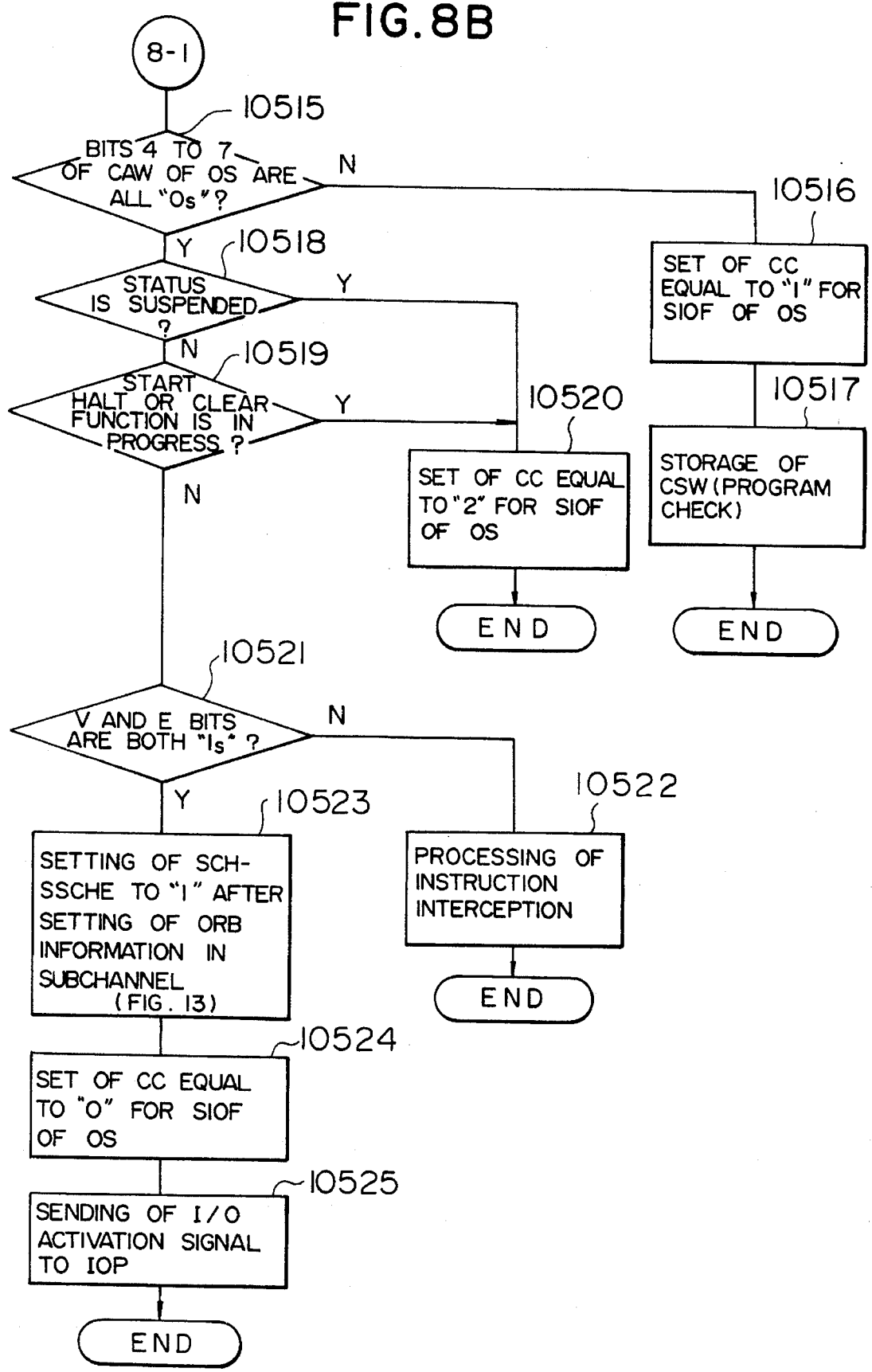

FIGS. 8(A) and 8(B) are flow charts for illustrating execution of the SIOF instruction issued by VM (or OS) according to the invention.

The processings shown enclosed by a broken line block in FIG. 8(A) corresponds to the processing shown in FIG. 6 in the similar manner. More specifically, the IE-mode decision processing at a step 10500 shown in FIG. 8 corresponds to the IE-mode decision processing at the step 10200 shown in FIG. 6. Accordingly, description of the processings (a) to (d) in conjunction with the first exemplary realization of the TPI instruction execution holds valid for the processings (a) to (d) for the execution of the SIOF instruction by replacing "TPI instruction" by "SIOF instruction" and by modifying "Decision is made as to whether or not the TPI instruction is issued by the VM of M/EX-mode by checking whether SD-ARCH 1510 of the SD 1500 is "1" or not, wherein when the SD-ARCH 1510 is "0", the processing proceeds to the next step (c) so as to read "Decision is made as to whether or not the SIOF instruction is issued by the VM of M-mode by checking whether SD-ARCH 1510 of the SD-1500 is "1" or not, wherein when SD-ARCH 1510 is "0", the processing proceeds to the next step (c)". The following description is directed to the processings succeeding to the step (d).

(e) Decision is made as to whether the bit 0 of the guest CR0 is "1" or not (step 10508). When it is "0", the instruction interception processing is performed (step 10514).

(f) From the virtual machine address designated by the DEV-ORG 1550 of the SD 1500 (see FIG. 12 (A)) and the second operand address of the SIOF instruction (see FIG. 26), the corresponding address of the DEVTBL (see FIG. 12(B)) is determined (step 10509).

(g) From the DEVTBL shown in FIG. 12 (B), the D bit, LPM and the real subchannel number are determined (step 10510).

(h) It is decided whether the D bit is "1" or not (step 10511). When it is "0", the instruction interception processing (step 10514) is performed.

(i) From the real subchannel number, the corresponding subchannel 1400 is obtained.

(j) Unless the above-mentioned subchannel is present (step 10512), the instruction interception processing (step 10514) is performed.

(k) Decision is made as to whether the SCH-DIO 1410 of the above-mentioned subchannel 1400 is "1" or not. When it is "0", the instruction interception processing (step 10514) is performed.

(l) It is decided whether the SD-RID 1520 of the SD 1400 is equal to the SCH-RID 1420 (step 10513). If it is not the case, the instruction interception processing (step 10514) is performed.

(m) It is called whether the bits 4 to 7 of the CAW of VM are all "0s" (step 10515). If not the case, the condition code CC is set to "1" (step 10516), whereon program check is stored at the CSW of VM (step 10517). Then, execution of the instruction comes to an end.

(n) Decision is made as to whether the subchannel 1400 status reserving state (step 10518). If so, the condition code CC is set to "2" (step 10520), whereupon execution of the instruction comes to an end.

(o) When the function of start, halt or clear is in progress in the subchannel 1400 (step 10519), the condition code CC is set to "2" (step 10520), whereupon execution of the instruction comes to an end.

(p) It is checked whether V bit and E bit indicating the validity of the subchannel 1400 are both "1s". If the answer is negative (NO), i.e. when any one of these bits V and E is "0", then the instruction interception processing is performed (step 10522).

(q) The SCH-SSCHE 1430 of the subchannel 1400 is set to "1". Further, the information corresponding to the ORB is prepared, as shown in FIG. 13, in the manner described below (step 10523).

(q-1) The bits 0 to 15 cf the interrupt parameter are all placed with "0", while the bits 16 to 31 are placed with the virtual input/output device address designated by the SIOF instruction. When the I/O interrupt is to be reflected to a VM, the address of this virtual input/output device address is used.

(q-2) With the key in the subchannel 1400, key for the CAW of the VM is set.

(q-3) A format flag is set to "0" which indicates the CCW of format 0. Further, the S bit., P bit, I bit, A bit and V bit employed for controlling the extended function in the M/EX mode are each placed with "0".

(q-4) The LPM of the DEVTBL is placed at the field LPM within the subchannel 1400.

(q-5) The bits 0 to 7 of the CCW address field in the subchannel 1400 are placed with "0", respectively, while the bits 8 to 31 are placed with the bits 8 to 31 of the CAW of VM, respectively.

The foregoing are the processings performed at the step 10523 shown in FIG. 8(B).

(r) For the SIOF instruction, the condition code CC is set to "0" (step 10524).

(s) An input/output activation signal is sent to the IOP 3000, whereupon execution of the instruction is ended (step 10525).

(t) It should be added that through the instruction interception processing at the step 10522, the instruction is transferred to the VMCP, whereon the former is simulated by the latter.

The foregoing are the processings involved in the execution of the instruction SIOF.

Figure 9:
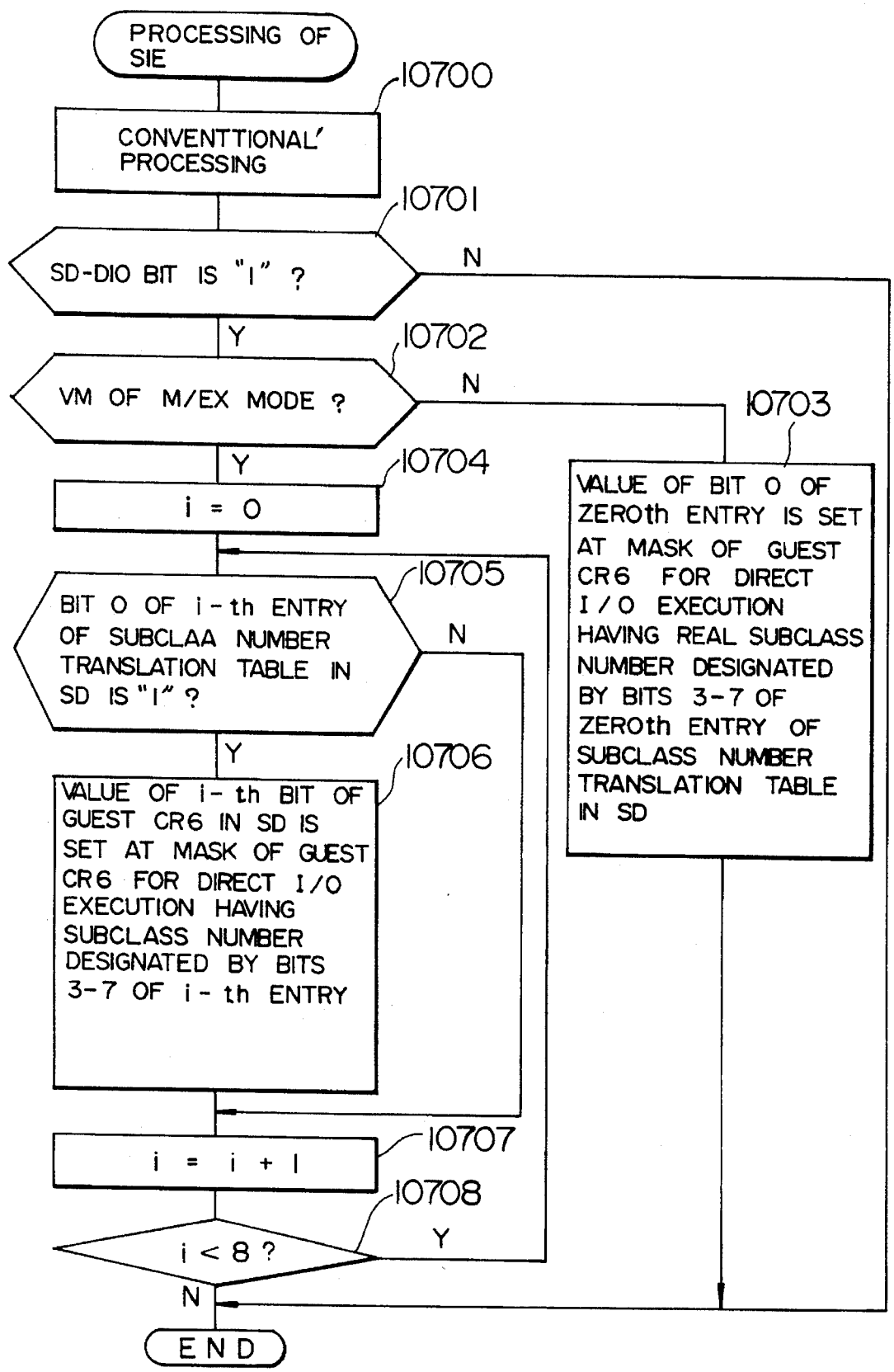
FIG. 9 is a flow chart for illustrating execution of an SIE instruction according to the invention.

(iv) Setting of guest CR6 for direct I/O execution (iv)-1 Setting by SIE instruction FIG. 9 is a flow chart for illustrating extension of the SIE instruction according to the invention.

A method of setting the guest CR6 2450 for the direct input/output execution by the extended SIE instruction provided according to the invention will be described by reference to FIG. 9. Through this processing, the mask of the interrupt subclass dedicated to a running VM is set at the guest CR6 2450 for the direct input/output execution at the time of activation of the VM.

(a) At a step 10700, processing of the SIE instruction known heretofore is performed. Through this processing, values of the guest PSW and the guest CR6 stored in the SD 1500 are placed in the guest PSW 2430 and the guest CR6 2440, respectively, and the IE-mode bit is set to "1".

(b) Decision is made as to whether or not the value of the SD-DIO 1530 is "1" by referring to the SD 1500 (step 10701). When the SD-DIO 1530 is "0", this means that the direct input/output execution is not supported. Accordingly, execution of the instruction comes to an end.

(c) When the SD-DIO 1530 is "1", the value of the SD-ARCH 1510 is checked (step 10702). When the SD-ARCH 1510 is "0", indicating the VM of M-mode, the processing proceeds to a step 10703, while the processing proceeds to a step 10704 when the SD-ARCH 1510 is "1", indicating the VM of M/EX-mode.

(d) In the case of VM of M-mode, the value of bit 0 of the zeroth entry (D bit of SCL-CNTL) of the subclass number translation table 1540 of the SD 1500 is set at the mask of the CR6 2450 for the direct input/output execution having as the real subclass number the bits 3 to 7 (S field of the SCL-CNTL) of the subclass number translation table 1540 of the SD 1500 (step 10703). Assuming, by way of example, that the zeroth entry is $(84)_{16}$, then the value of the D bit is "1" with that of the S field being "4". Accordingly, the CR6 2450 for the direct input/output execution is placed with (08000000). Further, when the zeroth entry is $(04)_{16}$, then the D bit is "0" with the S field being "4". Accordingly, the guest CR6 2450 for the direct input/output execution is placed with $(00000000)_{16}$. Concerning the I/O interruption enabling condition for the M-mode VM, description will be made in detail in the section (V). It should however be mentioned here that the I/O interruption enabling condition is controlled by the I/O mask of the PSW of VM and the control register CR2 of the VM. Thus, when the VMCP dispatches a VM of M-mode, the number of the subclass to be dedicated to the VM is set at the S field of the zeroth entry SCL-CNTL of the subclass number translation table 1540. Additionally, when the CR2 of the VM is all "1", the D bit of the SCL-CNTL is placed with "1", while otherwise the D bit of the SCL-CNTL is placed with "0". After execution of the processing at the step 10703 mentioned above, execution of the instruction SIE comes to an end.

(e) In the case of VM of the M/EX-mode, the register i for counting the virtual subclass number is set to "0" (step 10704).

(f) It is checked at a step 10705 whether or not the bit 0 (D bit) of the i-th entry of the subclass number table in the SD 1500 is "1", i.e. whether or not the virtual subclass i is allocated with the real subclass for the direct input/output execution. When the bit 0 of the first entry is "0", the processing proceeds to a step 10707.

(g) In case the bit 0 of the i-th entry is "1", the value of the i-th bit of the intra-SD guest CR6 is set at the mask of the guest CR6 2450 for the direct input/output execution having as the real subclass number the bits 3 to 7 (S field) of the i-th entry at a step 10706.

Assuming, by way of example, that the subclass number translation table 1540 contains $(8284000000000000)_{16}$ with the guest CR6 containing $(FF000000)_{16}$, the guest CR6 2450 for the direct input/output execution is placed with $(28000000)_{16}$. Further, in case the subclass number translation table 1540 contains $(8284000000000000)_{16}$ with the guest CR6 containing $(F0000000)_{16}$, the guest CR6 2450 for the direct input/output execution is placed with $(20000000)_{16}$. Thus, it is required for the VMCP to establish the correspondence relation between the virtual subclass number and the dedicated subclass number in the subclass number translation table 1540 before dispatching the VM of M/EX-mode.

(h) Next, the register i is incremented by "1" (step 10707).

(i) Decision is made as to whether the content of the register i is smaller than 8 (step 10708). If so, the step 10705 is resumed. Otherwise, execution of the instruction SIE is ended.

(iv-2) Setting by LCTL instruction

Figure 10:
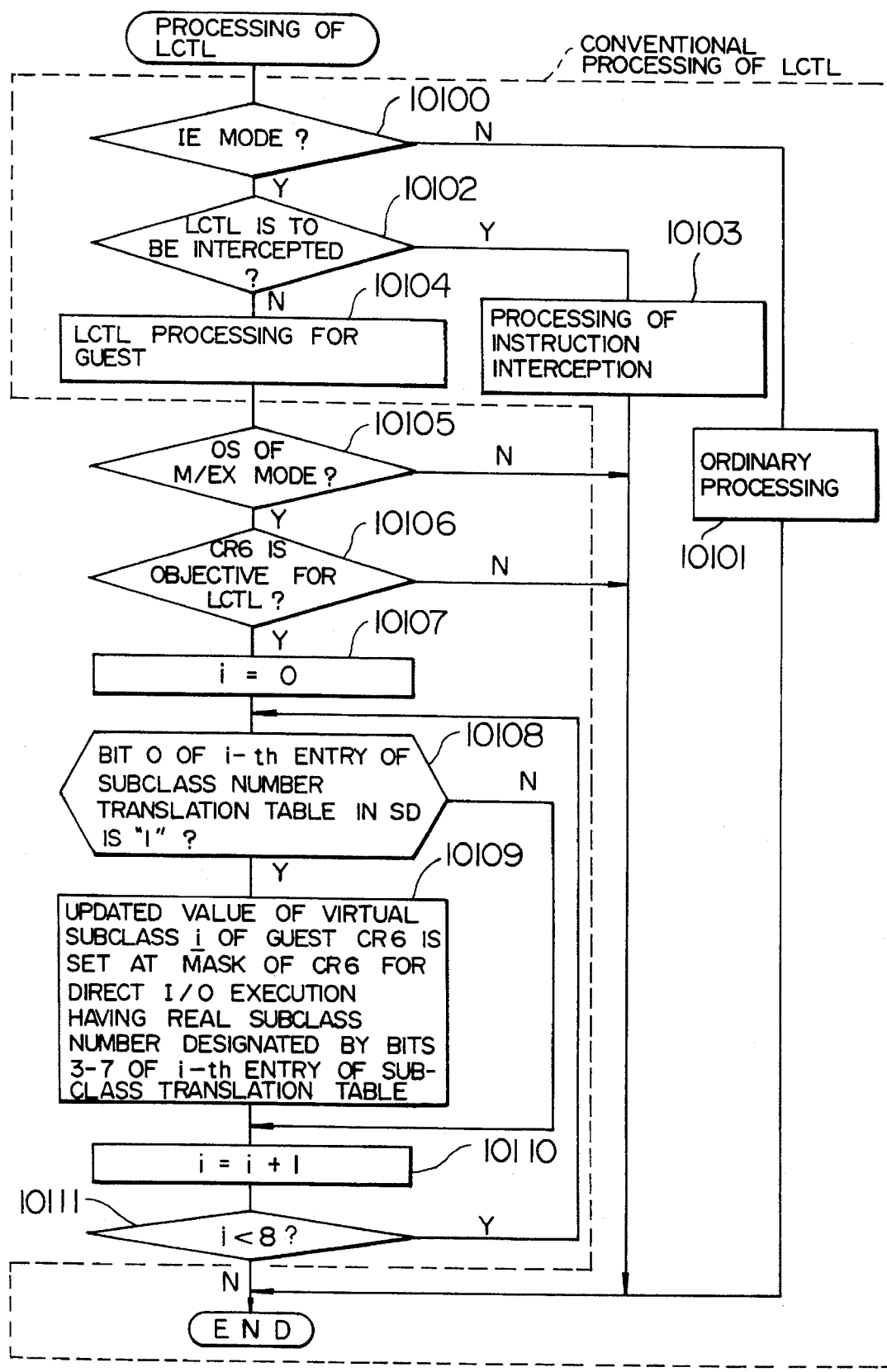
FIG. 10 is a flow chart for illustrating execution of an instruction LCTL according to the invention.

FIG. 10 illustrates in a flow chart execution of the LCTL instruction according to the invention.

A method of setting the guest CR6 2450 for the direct input/output execution with the aid of the LCTL instruction extended according to the teaching of the invention will be described in detail by reference to FIG. 10. Through this processing, the mask value of the subclass dedicated to a VM of M/EX-mode is set in the guest CR6 2450 for the direct input/output execution even in the case the guest CR6 2440 is updated by the LCTL instruction in the course of running of the VM. Parenthetically, the processings indicated as enclosed within a broken line frame in FIG. 10 are the steps involved in the conventional method of processing the LCTL. The instruction processings as added by the extension are shown outside of the broken line frame.

(a) Decision is made as to whether or not any VM is running by checking the IE-mode bit 2400 (step 10100). When the IE-mode bit 2400 is "0", indicating that no VM is running, the LCTL instruction is ordinarily executed (step 10101), whereupon execution of the instruction comes to an end.

(b) Decision is made as to whether the LCTL instruction is the objective for interception by checking the LCTL interception mask 1591 contained in the SD 1500 (step 10102). If so, the instruction interception is issued by the conventional method (step 10103), whereon interruption is made to VMCP.

(c) Next, the LCTL instruction processing is performed for the guest (step 10104). More specifically, the control register for the running VM such as the guest CR6 2440 or the like is updated to a value designated by the instruction. The processing mentioned above is the ordinary or conventional LCTL instruction processing.

(d) Next, it is decided whether the SD-ARCH 1510 contained in the SD 1500 is "1" or not (step 10105). In other words, decision is made as to whether or not the VM is of the M/EX-mode. If not, the processing comes to an end.

(e) When the VM is of the M/EX-mode, it is then decided whether or not the guest CR6 is to be updated (step 10106). If not, the processing is ended.

(f) When the guest CR6 is to be updated, the mask updating processing of the guest CR6 2450 for the direct input/output execution is performed in the manner mentioned below.

(f-1) The register i for counting the virtual subclass number is placed with "0" (step 10107).

(f-2) Subsequently, it is decided whether or not the subclass of concern is the one dedicated to the direct input/output execution by checking whether the bit 0 (D bit) of the i-th entry of the subclass translation table incorporated in the SD 1500 is "1" or not (step 10108). When the bit 0 of the i-th entry is "0", the processing proceeds to a step 10110.

(f-3) When the bit 0 of the i-th entry is "1", the mask value is set for the virtual subclass i of the guest CR6 2440 for the direct input/output execution having a real subclass number designated by the bits 3 to 7 of the i-th entry of the subclass translation table (step 10109).

(f-4) The register value i is incremented by 1 (step 10110).

(f-5) It is then checked whether i is smaller than 8 (step 10111). If so, the step 10108 is resumed. If i is equal to ro greater than 8, execution of the LCTL instruction is ended.

Assuming, by way of example, that after updating the guest CR6 2440 contains $(0F000000)_{16}$ and the subclass translation table is of $(8284000000000000)_{16}$, the guest CR6 2450 for direct input/output execution is loaded with $(08000000)_{16}$.

(v) Execution of input/output (I/O) interrupt

First, description is made in detail of the conditions for allowing the I/O interrupt to occur in the M-mode architecture. As is well known, when the bit 12 of the program status word PSW is "1", i.e. in the EC mode, the I/O interrupt is enabled only when the bit 6 (I/O mask) of the PSW is "1" and when the channel mask of the control register CR2 associated with the channel which has activated and executed the input/output operation is "1". Parenthetically, the EC mode is provided for both of M-architecture mode and the M/EX-architecture mode, respectively.

Further, when the bit 12 of the PSW is "0", i.e. in the BC mode, the conditions for enabling the I/O interrupt differ in dependence on the number of the channel which has activated and executed the input/output operation. It should be mentioned that the BC mode is provided only for the VM of M-architecture.

When the channel number is in the range of 0 to 5, the channel mask is defined by the bit of 0 to 5 of the PSW. When the relevant mask is 1, the I/O interrupt is enabled. In case the channel number is greater than 6, then the input/output interrupt is enabled when the bit 6 (I/O mask) of the PSW is "1" and when the mask of the control register associated with the channel activated and executed the input/output operation is "1", as in the case of EC mode.

FIG. 27 is a view for illustrating the interrupt information of M-architecture. As can be seen in this figure, there is stored in a region of 8 bytes located next to the address 64 of the main storage the channel status word (CSW) as the input/output end status information. The key shown in the figure is the protection key designated by the CAW upon issuance of the SIOF instruction. Further, logout information L assumes "1" when the input/output operation has been ended abnormally in a particular state. When L is "1", there is stored i a region of 4 bytes located next to the address 176 of the main storage the detailed information of the error or logout, i.e. LCL (Limited Channel Logout). However, the frequency at which the LCL is generated is extremely low. Code CC is a code indicating that abnormality has been detected in the device or others before starting the input/output operation although the condition code of the SIOF instruction is "0" and is referred to as the deferred condition code. The CCW address assumes a value equal to the address of the CCW executed finally and added with 8. The count (COUNT) contains the remaining bytes, while UNIT STATUS and CHANNEL STATUS show the end status of the input/output operation.

In the foregoing, the I/O interrupt in the M-architecture mode has been explained.

Next, description is turned to the I/O interrupt in the M/EX-architecture mode.

As is shown in FIG. 25, in the I/O interrupt of the M/EX architecture, the subchannel number is stored at the address 186 of the main storage, while the parameters designated for that subchannel by the SSCH instruction are stored in a region of 4 bytes as counted from the address 188. As will be appreciated, no information corresponding to the CSW in the M architecture is stored upon the I/O interruption in the M/EX-architecture mode.

The condition for generation of the input/output interrupt resides only in that the bit 6 (I/O mask) of the PSW is "1" and that the subclass mask of the control register CR6 corresponding to the subclass number designated for the subchannel of concern is "1". As the subclass number, a value in the range of 0 to 7 can be set on a subchannel basis by an MSCH instruction which is one of the I/O instructions.

(v-1) Interrupt activation processing

Figure 22:
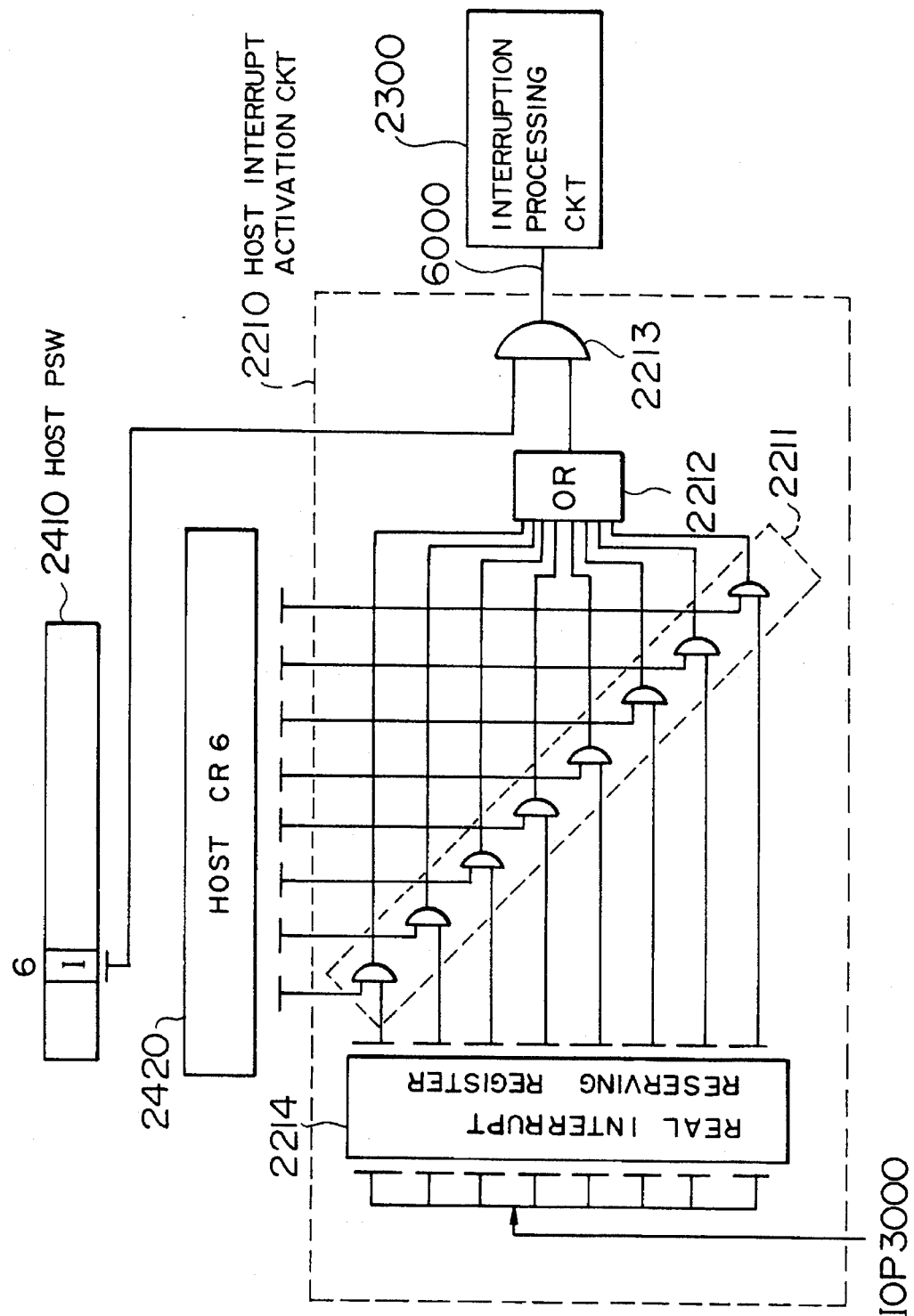
FIG. 22 is a schematic diagram of a host interrupt activation circuit.

The interrupt activation circuit according to the invention is composed of a host interrupt activation circuit 2210, a guest interrupt activation circuit 2220 and a BC-mode interrupt activation circuit 2230. Incidentally, the host activation circuit 2210 is of a conventional circuit, as shown in FIG. 22.

Figure 14:
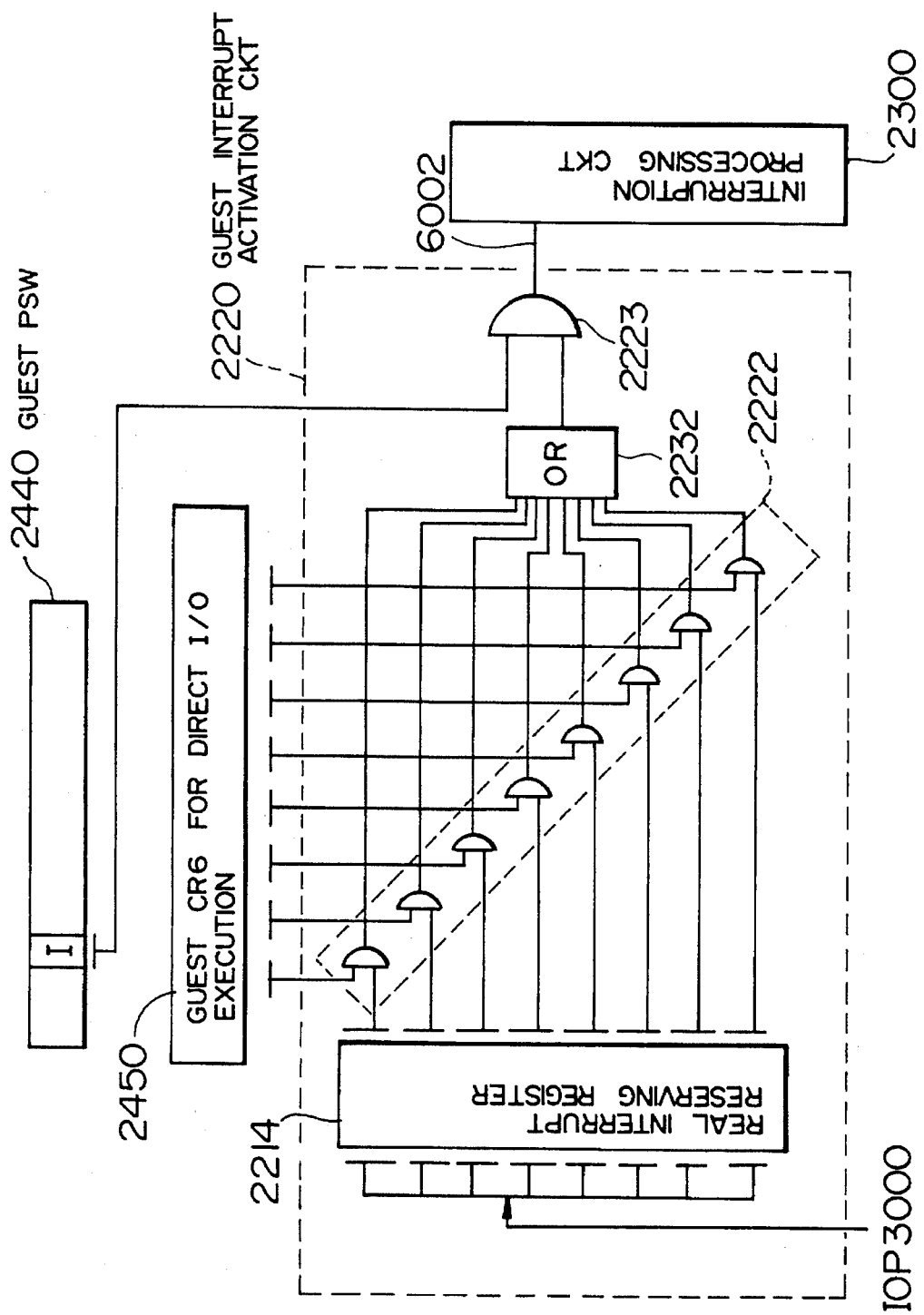
FIG. 14 is a schematic block diagram showing a general arrangement of a guest interrupt activation circuit according to an embodiment of the invention.

FIG. 14 is a circuit diagram showing a structure of the guest interrupt activation circuit according to an embodiment of the invention.

The guest interrupt activation circuit 2220 is implemented in a same structure as the host activation circuit 2210. When the reserved or pending I/O interrupt originates in the subclass dedicated to the running VM which is capable of interruption, i.e. when the I/O mask of the guest PSW 2440 is "1" and when the mask of the guest CR6 2450 for direct input/output execution of the above-mentioned subclass is "1" (indicating that the corresponding VM control register CR is capable of interruption), one of AND circuits 2222 is turned on, whereby a signal passing through an OR circuit 2232 can pass through the conducting AND circuit 2223 to provide the output of "1" which constitutes the activation signal sent to the interrupt processing circuit 2300.

Figure 15:
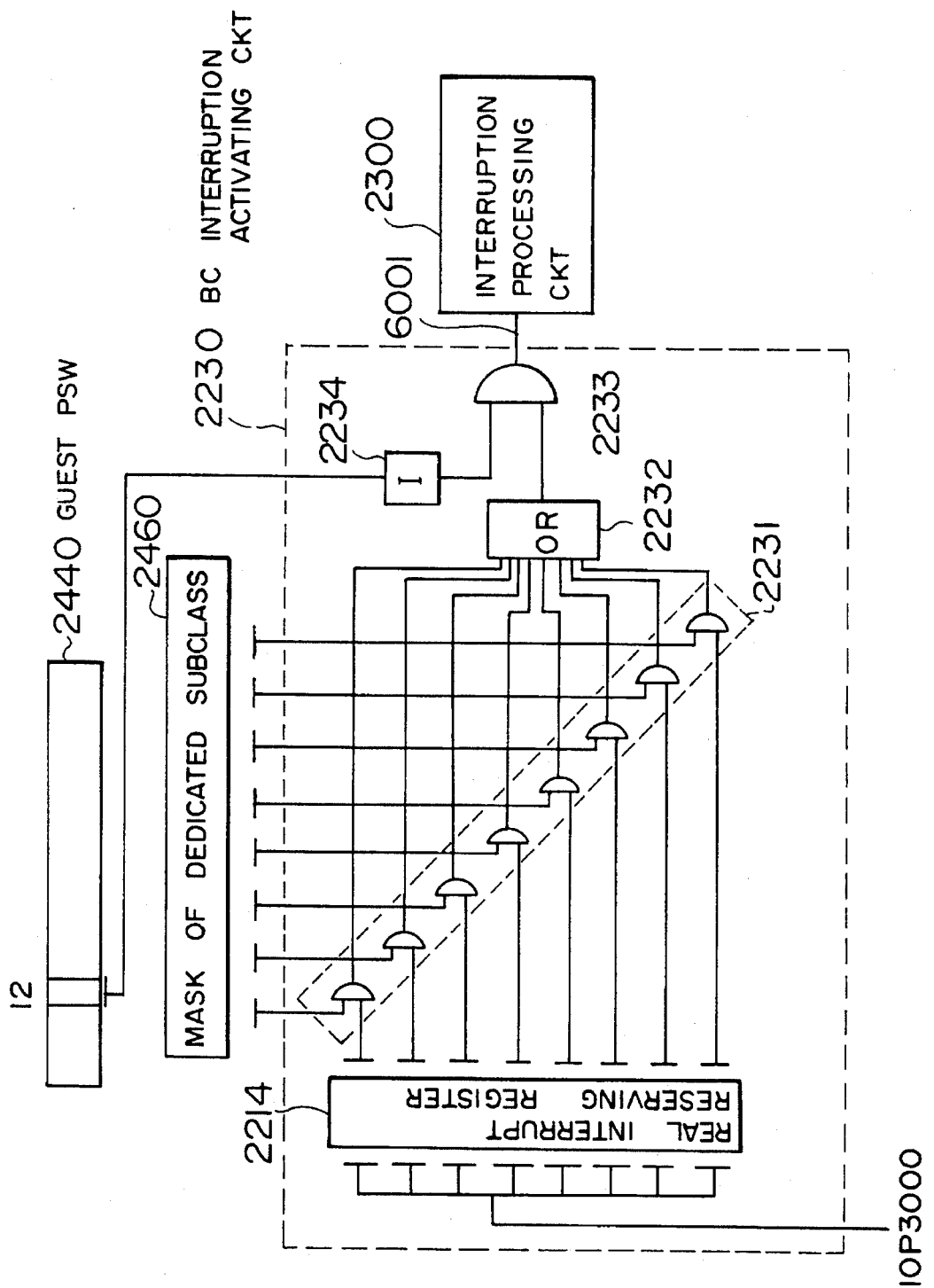
FIG. 15 is a schematic block diagram showing an exemplary structure of a BC-mode interrupt activation circuit according to the invention.

FIG. 15 is a circuit diagram showing a structure of the BC-mode interrupt activation circuit.

This circuit serves to intercept the interrupt of the subclass dedicated to a running VM issued thereby in the BC mode to the VMCP. The dedicated subclass mask 2460 is realized in the form of a register for identifying the subclass dedicated to the running VM, which register is set by the SIE instruction. Assuming, by way of example, that the real subclass 0 is a subclass dedicated to a VM to run, then $(80)_{16}$ is set at the dedicated subclass mask 2460 by the SIE instruction. The bit 12 of the guest PSW 2440 being "0" indicates the BC mode. Accordingly, in the BC mode, the output of an inverter 2234 is "1" and applied to an input of an AND circuit 2233. On the other hand, when an input/output interrupt request is issued from the subclass dedicated for the running VM, one of AND circuits 2231 produces an output of "1" (indicating the presence of the interrupt request from the dedicated subclass). Thus, when the guest PSW 2440 is in the BC mode, the output of the AND circuit 2233 is "1", whereby an activation signal is sent to the interrupt processing circuit 2300.

(v-2) Interrupt reflecting processing

Figure 16:
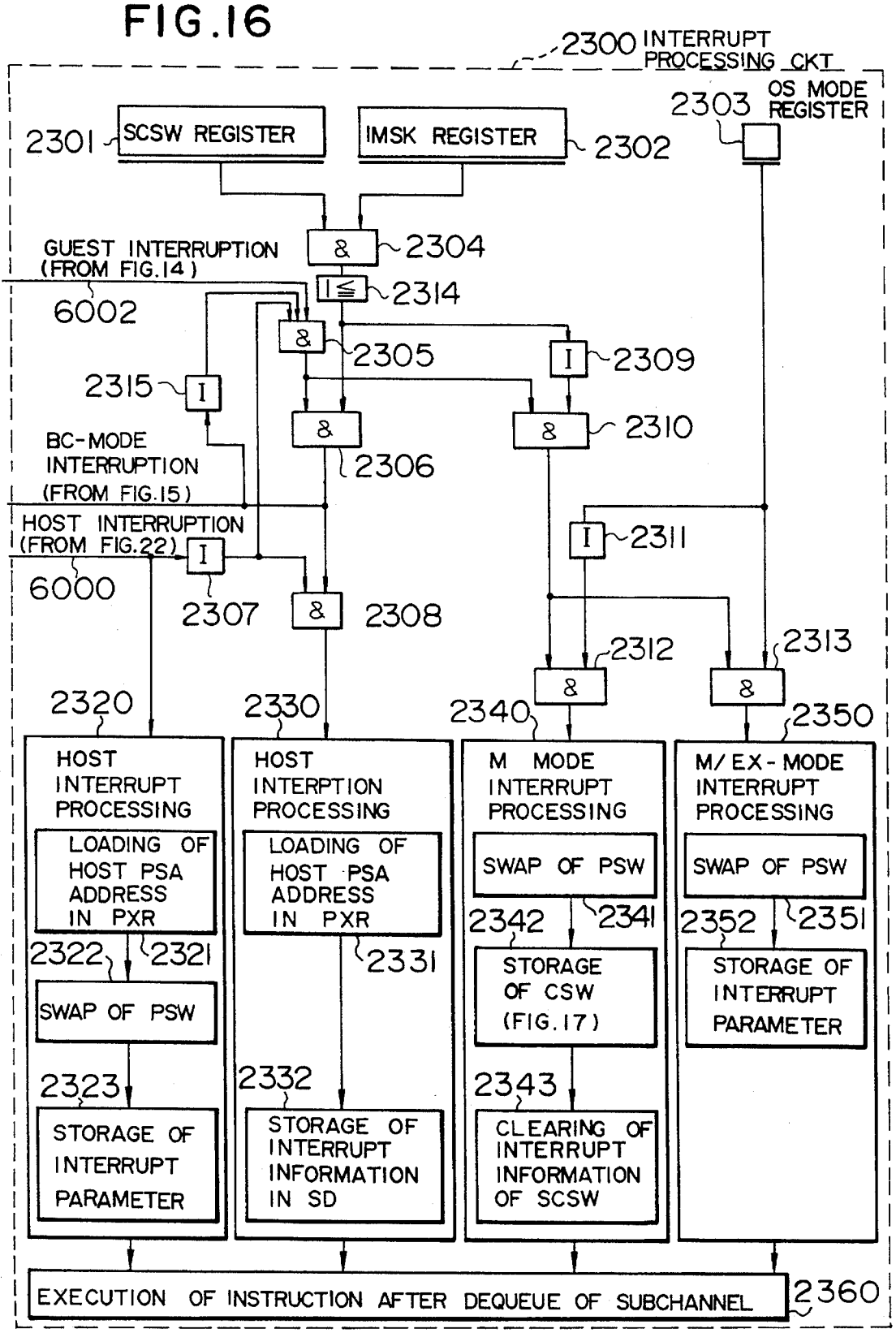
FIG. 16 is a schematic block diagram showing a structure of an interrupt processing circuit according to an embodiment of the invention.

FIG. 16 is a diagram showing a structure of the interrupt processing circuit according to an embodiment of the invention.

By reference to FIG. 16, description will be made of an interrupt reflecting processing for VM or VMCP performed by the interrupt processing circuit 2300.

In FIG. 16, an SCSW register 2301 serves as the register for storing the subchannel status word of the subchannel 1400 for which an interrupt request is issued. An IMSK register 2302 serves as the register for holding the IMSK 1560 which is designated by the SD 1500 (an operand of the SIE instruction) when an OS is dispatched (reference may also be made to FIG. 12A). Further, an OS mode register 2303 serves to hold the SD-ARCH 1510 designated by the SD 1500.

The interrupt processing circuit according to the invention performs four types of processings, as mentioned below.

(a) When an activation signal is transmitted onto a signal line 6000 from the host interrupt activation circuit shown in FIG. 22, a host interrupt processing 2320 is executed. The signal is not supplied to any other circuits because of signal inversion by an inverter 2307, disabling an AND circuit 2308.

(b) When an activation signal is produced on a signal line 6001 from the BC-mode interrupt activation circuit 2230 shown in FIG. 15 or when the activation signal sent onto a signal line 6002 from the guest interrupt activation circuit 2220 shown in FIG. 14 contains the interrupt information designated by the IMSK 1560, a host interception processing 2330 is executed.

(c) In case a running VM is of M-mode when the activation signal is sent onto the signal line 6002 from the guest interrupt activation circuit 2220 shown in FIG. 14, an M-mode interrupt processing is executed.

(d) In case a running VM is of M/EX mode when the activation signal is sent to the signal line 6002 from the guest interrupt circuit 2220 shown in FIG. 14, an M/EX-mode interrupt processing 2350 is executed.

Even when a plurality of interrupt requests take place, only one of the four processings mentioned above is executed. The highest priority is assigned to the processing (a), and priorities in the descending order are assigned to the processings (b), (c) and (d), respectively.

Next, detailed description will be made of the request for the interrupt processing and the state of execution for each of the processings mentioned above.

Execution of Host Interrupt Processing

Referring to FIG. 16, when an activation signal is sent onto the signal line 6000 from the host interrupt activation circuit 2210, the host interrupt processing 2320 is executed.

In the host interrupt processing 2320, a host PSA address is loaded in a prefix register PXR for making access to the PSA of the host (step 2321), and swapping of the PSW is performed by the host PSA for issuing a message of the I/O interrupt (step 2322). Subsequently, the interrupt parameter is received from the subchannel to be stored in the host PSA (step 2323). This subchannel is dequeued from the I/O interrupt request queue 1200 (see FIG. 21), whereon the instruction is executed (step 2360). In this way, a VMCP interrupt processing program (interception program) is executed.

Execution of Host Interception Processing

When the activation signal is sent onto the signal line from the BC-mode interrupt activation circuit 2230, the inverter 2307 outputs "1" to open the AND circuit for thereby allowing the host interception processing 2330 unless no activation signal is sent to the signal line 6000 from the host interrupt activation circuit 2210 at that time. On the other hand, when the activation signal is sent to the signal line 6002 from the quest interrupt activation circuit 2220, the host interception processing 2330 is executed on the conditions that no activation signal is sent to the signal line 6000 at that time point and that the SCSW register 2301 holding the SCSW and the IMSK register 2302 holding the content of the IMSK of SD 1500 output both "1s" with the output of AND circuit 2306 and 2308.

In execution of the host interception processing 2330, the host PSA address is first loaded in the prefix register PXR (step 2331), and the number of the subchannel which issued the request for interrupt being processed is stored in the SUBID 1570 of the SD 1500. Further, the interrupt parameter of that subchannel is stored in the IPRM 1580. Subsequently, the subchannel is dequeued from the I/O interrupt request queue 1200, whereon an instruction succeeding to the SIE instruction and stored in the host PSW 2410 is executed (step 2360).

In this way, execution is started from the instruction succeeding to the SIE instruction of the VMCP, wherein the VMCP performs the I/O interrupt processing by using the information contained in the SD 1500.

Execution of M-mode Interrupt Processing

When the activation signal is sent to the signal line 6002 from the guest interrupt activation circuit 2220, the M-mode interrupt processing 2340 is executed on the conditions that no activation signal is sent to the signal lines 6000 and 6001, and that the SCSW register contains no interrupt information designated by the IMSK 1560 while the OS-mode register 2302 stores therein "0" indicating that an M-mode VM is running, because then the outputs of the inverters 2309 and 2311 are both "1" with the outputs of the AND circuits 2305, 2310 and 2312 being all "1s".

When the M-mode interrupt processing 2340 is executed, PSW swapping is carried out by using the PSA of the VM (step 2341), resulting in that the CSW is stored in the PSA of the VM (step 2342), as shown in FIG. 17.

Next, the interrupt information (SCSW register 2301) in the subchannel 1400 is cleared (step 2343). After having dequeued the subchannel 1400 from the I/O interrupt request queue 1400, the instruction is executed (step 2360).

Thus, the I/O interrupt processing program of the running VM (or OS) is executed.

Referring to FIG. 17, the interrupt information of M-architecture stored in the PSA of the subchannel 1400 issued the interrupt request so as to contain:

(a) protection key of CSW, (b) bit 4 (0) of CSW, (c) logout suspending bit (0) of CSW, (d) deferred CC of CSW (delay CC of SCSW), (e) CCW address of CSW (bit 8 to 31 of CCW address in SCSW), (f) DSB of CSW (DSB of SCSW), (g) CSB of CSW (SSB of SCSW), (h) count of CSW (count of SCSW), and (i) I/O address (bits 16 to 31 of interrupt parameter).

It should be mentioned that LCL creating processing is not performed in case the logout suspending bit L is "1" at the time of I/O interrupt of the M-mode VM. Accordingly, when the M-mode VM is dispatched, the bit 5 of the IMSK 1560 of the SD 1500 corresponding to the bit L is set to "1" to issue the SIE instruction.

In this manner, the interruption of the subclass dedicated to the running VM of M mode can be directly executed.

Execution of Interrupt Processing of M/EX Mode

When the activation signal is sent onto the signal line from the guest interrupt activation circuit 2220, the interrupt processing 2350 of M/EX mode is executed on the conditions that no activation signal is present on the signal lines 6000 and 6001, that the SCSW of the interrupt being processed contains no information designated by the IMSK 1560 and that "1" is stored in the OS mode register 2303, indicating that a VM of M/EX mode is running, because then the outputs of the AND circuits 2305, 2310 and 2313 are all "1s".

In the execution of the M/EX-mode interrupt processing, swapping of the PSW is carried out by using the PSA of the VM (step 2351), being followed by a step 2352 where the interrupt parameter stored in the relevant subchannel is stored in the PSA of the VM. Subsequently, the subchannel 1400 is dequeued from the I/O interrupt request queue, to thereby allow a succeeding instruction to be executed (step 2360).

Through the processing described above, the I/O interrupt processing program of a running OS can be executed. As the result of this, the interruption of the subclass dedicated to a running VM of M/EX mode can directly be executed.

(Second Embodiment of the Invention)

Figure 28:
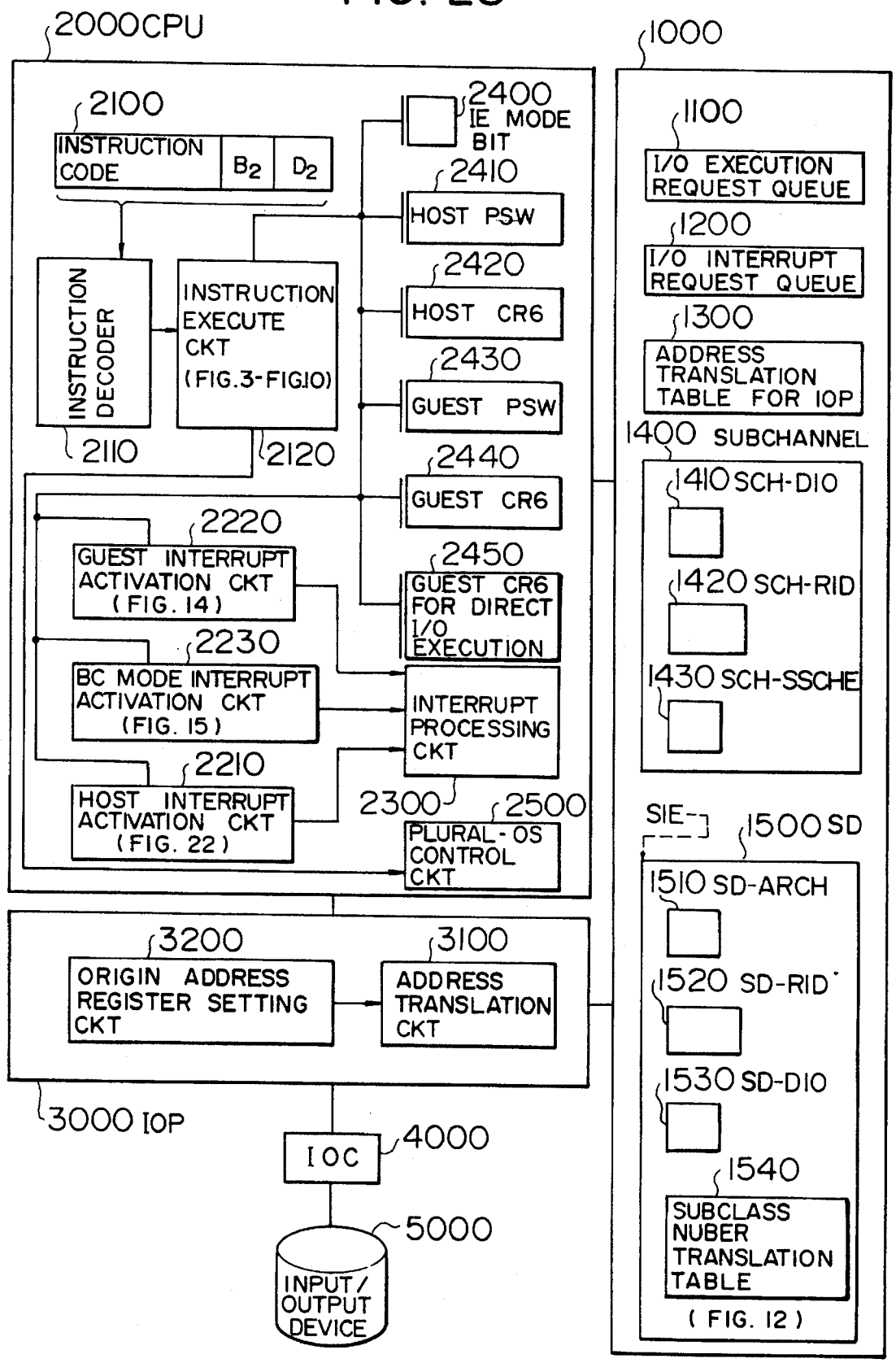
FIG. 28 is a block diagram showing a general arrangement of a logical partitioned system according to a second exemplary embodiment of the invention.

FIG. 28 is a functional block diagram showing a general arrangement of a logical partitioned system according to a second embodiment of the present invention.

The structure of the logical partitioned system shown in FIG. 28 is substantially same as that of the virtual machine system shown in FIG. 2 except for differences from the latter which are mentioned be low.

(a) The control blocks such as SD 1500 and others which are heretofore used for controlling individual VMs by the VMCP are provided on the main storage 1000 at regions capable of being accessed by software. According to the teaching of the invention incarnated in the second embodiment, these control blocks are located in the main storage at the regions to which only hardware can make access.

Figure 19:
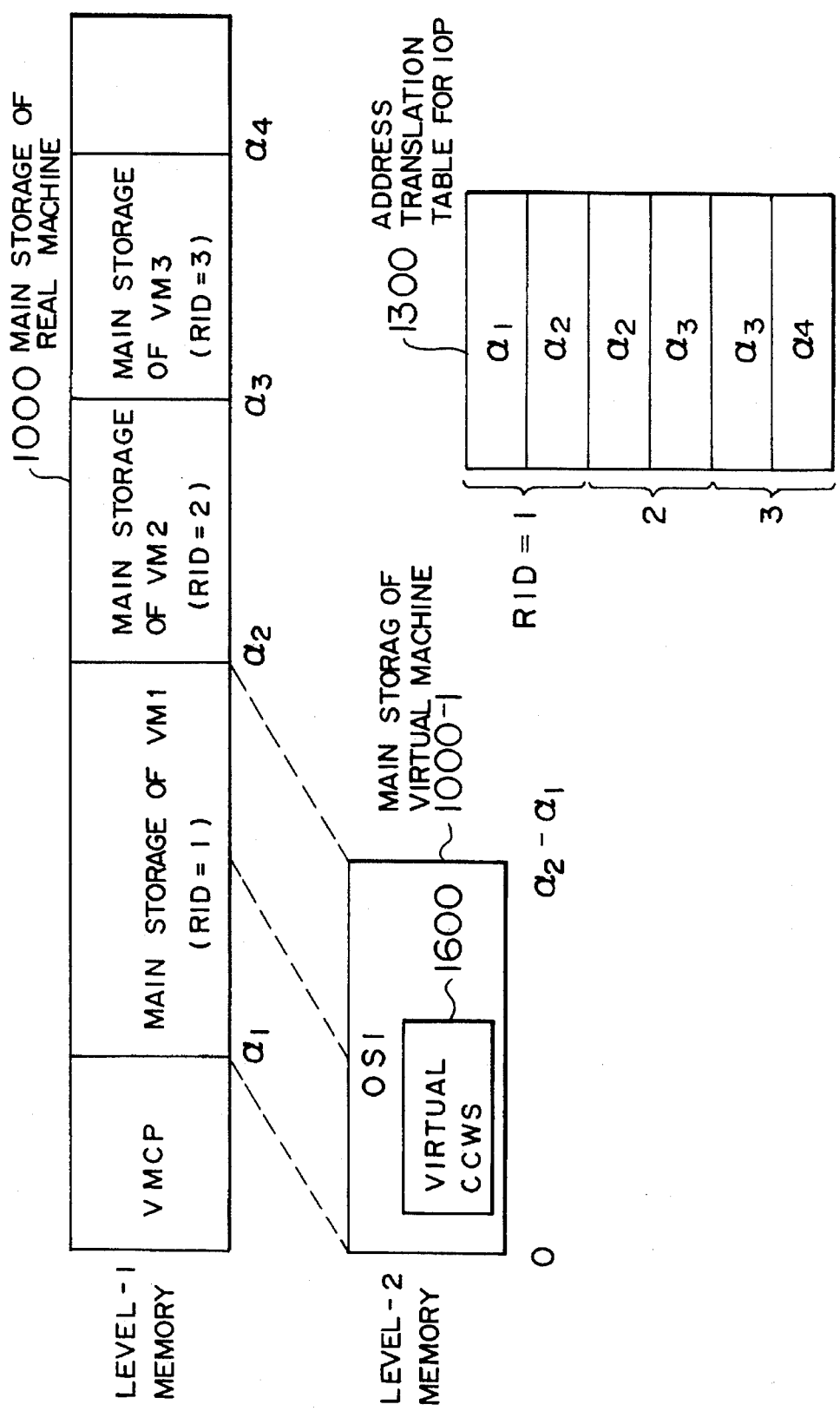
FIG. 19 is a view for illustrating the VMs of resident storage mode.
Figure 20:
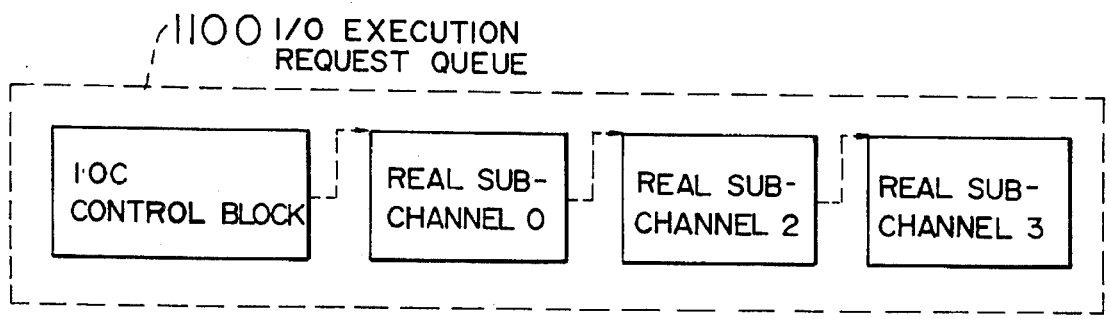
FIG. 20 is a diagram for illustrating an I/O execution request queue.

(b) In the case of the virtual machine system shown in FIG. 2, the VMCP is resident in the main storage, as shown in FIG. 19. In the logical partitioned system, the VMCP is not present. Instead, there is incorporated in the CPU 2000 a plural-OS control circuit which may be implemented by microcoding the conventional VMCP. In this manner, the logical partitioned system shares similar structure with the virtual machine system. However, clear difference is found between them in that while the VMCP which is software controls the runs of plural OSs in the case of the virtual machine system, the plural-OS control circuit composed of microprograms and hardware controls the run of plural OSs in the case of the logical partitioned system.

Operation of hardware shown in FIG. 28 which is extended for the logical partitioned system is also substantially similar to that of the hardware extended for the virtual machine system shown in FIG. 2 except for the respects mentioned below.

(a) As described hereinbefore in conjunction with FIGS. 6, 7, 8 and 10, in case an instruction issued by an OS can not directly be executed in the virtual machine system, an instruction is generated and interruption is made to the VMCP (i.e. interception of the instruction to the VMCP). In contrast, in the case of the logical partitioned system, unless an instruction issued by an OS can directly be executed, the plural-OS control circuit 2500 is activated to perform simulation of the instruction, wherein the extended SIE instruction according to the invention is issued to dispatch again the OS.

Figure 18:
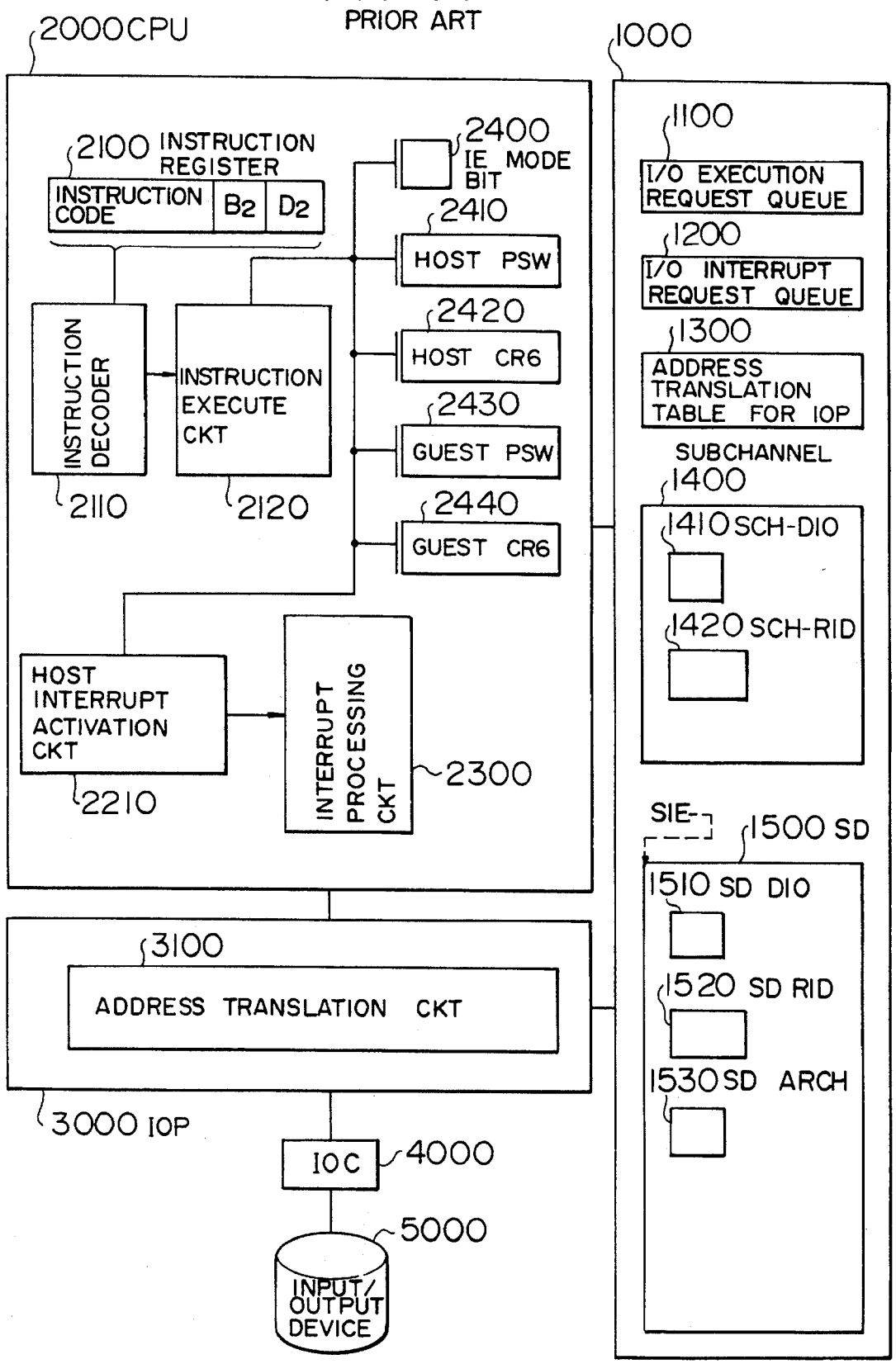
FIG. 18 is a block diagram showing a conventional type computer system.

(b) As described hereinbefore in conjunction with FIG. 18, when an interrupt request is issued by the host interrupt processing 2320 is activated in the case of the virtual machine system. However, in the logical partitioned system, the plural-OS control circuit 2500 is activated upon occurrence of the interrupt request by the host interrupt activation circuit 2210, whereby the microprogram for the interrupt processing incorporated in the plural-OS control circuit 2500 is executed.

(c) As described hereinbefore by reference to FIG. 18, when an I/O interrupt of the interrupt subclass for the direct input/output execution of a running OS takes place when the M-mode OS is in the BC mode and when the I/O interrupt of the subclass for direct input/output execution of the running OS containing the interrupt information indicated by the IMSK register 2302, the host interception processing 2330 is activated in the case of the virtual machine system. In the logical partitioned system when abnormally ended I/O interrupt is generated in the interrupt subclass for the direct input/output execution, the interrupt information is first stored in the SD, which is then followed by activation of the plural-OS control circuit 2500, whereby the interrupt processing for the OS is performed by the plural-OS control circuit 2500.

By virtue of the modifications described above, in the logical partitioned system, the plural-OS control circuit 2500 can perform the processings executed heretofore by the VMCP.

In this manner, because the plural-OS control circuit realizes the conditioning of environment for the direct input/output execution and the dispatch of OS, it is possible to execute with high efficiency the input/output of OS of M mode as well as OS of M/EX mode on the real machine of M/EX architecture as in the case of the virtual machine system.

In the above description of the second embodiment of the invention, it has assumed for convenience of description that the plural-OS control circuit 2500 is provided in each of the CPUs. However, it is equally possible to store the processings to be performed by the plural-OS control circuit 2500 in the main storage 1000 at regions to which only hardware can make access. In this case, only one set of the plural-OS control means is sufficient.

In the foregoing, description has been made concerning the processings for direct execution of the input/output instructions and the input/output interrupt of two modes, i.e. of M mode and M/EX mode on the real computer of M/EX architecture. It should however be understood that the concept of the present invention can be applied to the direct execution of the input/output instructions and the input/output interruptions of more than two modes differing from one another by simply increasing the number of registers and others.

We claim:

1. A computer system for running plural operating systems under control of a control program, said computer system comprising:

(a) a plurality of I/O devices;

(b) a main storage partitioned to said operating systems;

(c) an I/O processor, responsive to an I/O operation request by one of said operating systems which designates a subchannel number assigned to one of the I/O devices and a control signal required for execution of an I/O operation, for executing the I/O operation between said one I/O device and said main storage assigned to said one operating system;

(d) an instruction processor, responsive to an I/O instruction of a first kind issued from a first one of the operating systems which designates a subchannel number and an operand of a first kind which designates an I/O operation to be executed, for providing, without interrupting the control program, said I/O processor with the subchannel number and a control signal designated by the operand of the first kind, said instruction processor comprising:

(e) judging means, responsive to an I/O instruction of a second kind which includes a device address assigned to a second one of the I/O devices and an operand of a second kind which designates an I/O operation to be executed, for judging whether said I/O instruction is issued by a second one of the operating systems, and (f) I/O instruction execution means, responsive to an affirmative judging by said judging means, for providing said I/O processor with (i) a subchannel number assigned to said second one of the I/O devices and (ii) a control signal corresponding to the operand of the second kind;

interruption subclass indicating means for indicating one or more interruption subclasses for direct input/output execution at the time when an operating system starts to run on an instruction processor; and TPI (test pending interruption) instruction executing means, wherein:

when the operating system running on said instruction processor issues a TPI (test pending interruption) instruction for releasing an interrupt assigned with a highest priority from interrupts for said one of the input/output devices, when allowability of the interrupt for said input/output device is indicated by an interruption subclass mask, and storing identification information of the input/output device having the interrupt released from suspension in a main storage at a region designated by the TPI instruction, said TPI instruction execution means responds to the issuance of said TPI instruction to thereby release a pending interrupt having the highest priority assigned thereto from the interrupts for the input/ output device of said input/output devices, the interrupt allowability of said input/output device being indicated by said operating system, and store the identification information of the input/output device having the interrupt released in the main storage of said operating system at a region designated by said TPI instruction.

2. A computer system according to claim 1, further including:

interrupt suspension indicating means for indicating whether or not said control program suspends an input/output interrupt of the operating system; and TPI instruction intercept means for responding to the issuance of the TPI instruction by the operating system running on said instruction processor to thereby intercept said TPI instruction to simulate said TPI instruction by said control program, when said interrupt suspension indicating means indicates a suspension of the intercept.

3. A computer system for running plural operating systems under control of a control program, said computer system comprising:

(a) a plurality of I/O devices;

(b) a main storage partitioned to said operating systems;

(c) an I/O processor, responsive to an I/O operation request by one of said operating systems which designates a subchannel number assigned to one of the I/O devices and a control signal required for execution of an I/O operation, for executing the I/O operation between said one I/O device and said main storage assigned to said one operating system;

(d) an instruction processor, responsive to an I/O instruction of a first kind issued from a first one of the operating systems which designates a subchannel number and an operand of a first kind which designates an I/O operation to be executed, for providing, without interrupting the control program, said I/O processor with the subchannel number and a control signal designated by the operand of the first kind, said instruction processor comprising:

(e) judging means, responsive to an I/O instruction of a second kind which includes a device address assigned to a second one of the I/O devices and an operand of a second kind which designates an I/O operation to be executed, for judging whether said I/O instruction is issued by a second one of the operating systems, and (f) I/O instruction execution means, responsive to an affirmative judging by said judging means, for providing said I/O processor with (i) a subchannel number assigned to said second one of the I/O devices and (ii) a control signal corresponding to the operand of the second kind; and TSCH instruction execution means wherein:

when one of the operating systems running on said instruction processor issues to said one of the input/output devices a TSCH (test subchannel) instruction for releasing the input/output device of said input/output devices designated by said TSCH instruction from an interrupt suspension state and storing a state of said input/output device in a main storage at a region designated by said TSCH instruction, said TSCH instruction execution means responds to the issuance of said TSCH instruction by the operating system to one of the input/output devices dedicated to said operating system for thereby releasing the dedicated input/output device designated by said TSCH instruction from an interrupt suspension state and storing a state of said input/output device in the main storage of said operating system at a region designated by said TSCH instruction.

* * * * *